United States Patent
Kobayashi et al.

(10) Patent No.: US 6,768,739 B1
(45) Date of Patent: Jul. 27, 2004

(54) ROUTER WITH A CACHE HAVING A HIGH HIT PROBABILITY

(75) Inventors: Masayoshi Kobayashi, Tokyo (JP); Tutomu Murase, Tokyo (JP); Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/501,279

(22) Filed: Feb. 9, 2000

(30) Foreign Application Priority Data

Feb. 10, 1999 (JP) ............................................ 11-033287

(51) Int. Cl.[7] .......................... H04L 12/00; G06F 12/00
(52) U.S. Cl. .................. 370/392; 370/389; 370/395.31; 370/395.32; 370/395.1; 711/118; 711/216; 711/221
(58) Field of Search ................................. 370/389, 392, 370/395.1, 395.3, 395.31, 395.32, 400, 401, 395.7; 711/117, 118, 128, 216, 217, 218, 221; 709/238, 242, 245; 707/1–6, 101, 104.1

(56) References Cited

U.S. PATENT DOCUMENTS

| | | | |
|---|---|---|---|
| 5,781,431 A | | 7/1998 | Duret et al. |
| 6,052,683 A | * | 4/2000 | Irwin .......................... 707/8 |
| 6,141,738 A | * | 10/2000 | Munter et al. .............. 711/206 |
| 6,212,184 B1 | * | 4/2001 | Venkatachary et al. ..... 370/392 |
| 6,223,172 B1 | * | 4/2001 | Hunter et al. ................. 707/3 |
| 6,266,706 B1 | * | 7/2001 | Brodnik et al. ............. 709/242 |

FOREIGN PATENT DOCUMENTS

JP 6-261078 9/1994

OTHER PUBLICATIONS

"IP Lookups using Multiway and Multicolumn Search" Lampson B. et al. INFOCOM 98 Seventeenth Annual Joint Conference of the IEEE Computer and Communications Societies, pp. 1248–1256.

IEEE INFOCOM 91 pp. 1229–1236 Proceeding of the Annual Joint and Communications Societies.

European Search Report EP 00 10 2179 dated Dec. 16, 2002.

* cited by examiner

Primary Examiner—Huy D. Vu
Assistant Examiner—Thomas E. Volper
(74) Attorney, Agent, or Firm—Whitham, Curtis & Christofferson, P.C.

(57) ABSTRACT

A router allowing the entry hit probability of the cache to be increased is disclosed. The cache is searched using a different mask for each cache entry. A maximum or optimum cache prefix length is determined as a length of upper bits of the destination address of the received packet which are not masked by a corresponding mask. Alternatively, the cache is searched using longest prefix match (LFM). A cache entry allowing a plurality of destination addresses to be hit can be registered in the cache, resulting in increased cache hit probability.

33 Claims, 44 Drawing Sheets

FIG. 27

| ADDRESS | DATA BIT STRING | MASK BIT STRING |
|---------|-----------------|-----------------|
| 1 | 10100 | 11100 |
| 2 | 11010 | 11111 |
| 3 | 11000 | 11100 |

FIG. 28

| ADDRESS | DESTINATION FIELD | TRANSMISSION INTERFACE NUMBER |
|---|---|---|
| 1 | (10. 0. 0. 0/8) | 1 |
| 2 | (10. 2. 0. 0/16) | 2 |
| 3 | (10. 2. 3. 0/24) | 3 |
| 4 | (20. 0. 0. 0/8) | 4 |
| 5 | (0. 0. 0. 0/0) | 5 |
| 6 | (10. 1. 2. 0/18) | 6 |

FIG. 29

| ADDRESS | DESTINATION FIELD | TRANSMISSION INTERFACE NUMBER | REGISTRATION PREFIX LENGTH | RESIDENT FLAG |
|---|---|---|---|---|
| 1 | (10. 0. 0. 0/8) | 1 | 24 | 0 |
| 2 | (10. 2. 0. 0/16) | 2 | 24 | 0 |
| 3 | (10. 2. 3. 0/24) | 3 | 24 | 0 |
| 4 | (20. 0. 0. 0/8) | 4 | 8 | 1 |
| 5 | (0. 0. 0. 0/0) | 5 | 24 | 0 |
| 6 | (10. 1. 2. 0/18) | 6 | 18 | 0 |

FIG. 30

| ADDRESS | DESTINATION FIELD | TRANSMISSION INTERFACE NUMBER |
|---|---|---|
| 1 | NO ENTRY | |
| 2 | NO ENTRY | |
| 3 | NO ENTRY | |
| 4 | (20. 0. 0. 0/255. 0. 0. 0) | 4 |

FIG. 31

| ADDRESS | DESTINATION FIELD | TRANSMISSION INTERFACE NUMBER |
|---|---|---|
| 1 | (10. 5. 1. 0/255. 255. 255. 0) | 1 |
| 2 | NO ENTRY | |
| 3 | NO ENTRY | |
| 4 | (20. 0. 0. 0/255. 0. 0. 0) | 4 |

FIG. 32

| ADDRESS | DESTINATION FIELD | TRANSMISSION INTERFACE NUMBER |
|---|---|---|
| 1 | (10. 5. 1. 0/255. 255. 255. 0) | 1 |
| 2 | (10. 2. 3. 0/255. 255. 255. 0) | 3 |
| 3 | NO ENTRY | |
| 4 | (20. 0. 0. 0/255. 0. 0. 0) | 4 |

FIG. 33

| ADDRESS | DESTINATION FIELD | TRANSMISSION INTERFACE NUMBER |
|---|---|---|
| 1 | (10. 5. 1. 0/255. 255. 255. 0) | 1 |
| 2 | (10. 2. 3. 0/255. 255. 255. 0) | 3 |
| 3 | (1. 1. 1. 0/255. 255. 255. 0) | 5 |
| 4 | (20. 0. 0. 0/255. 0. 0. 0) | 4 |

FIG. 34

| ADDRESS | DESTINATION FIELD | TRANSMISSION INTERFACE NUMBER |
|---|---|---|
| 1 | (10. 0. 0. 0/8) | 1 |
| 2 | (10. 2. 0. 0/16) | 2 |
| 3 | (10. 2. 3. 0/24) | 3 |
| 4 | (20. 0. 0. 0/8) | 4 |
| 5 | (0. 0. 0. 0/0) | 5 |
| 6 | (10. 1. 2. 0/18) | 6 |

FIG. 35

| ADDRESS | PREFIX BIT STRING | MASK BIT STRING |
|---|---|---|
| 1 | 10100000 | 11100000 |
| 2 | 11010000 | 11110000 |
| 3 | 11000000 | 11110000 |
| 4 | 11011000 | 11111000 |

FIG. 36

| ADDRESS | DESTINATION FIELD | TRANSMISSION INTERFACE NUMBER |
|---|---|---|
| 1 | (10. 0. 0. 0/8) | 10 |
| 2 | (10. 2. 0. 0/16) | 20 |
| 3 | (10. 2. 3. 0/24) | 30 |
| 4 | (20. 0. 0. 0/8) | 40 |
| 5 | (0. 0. 0. 0/0) | 50 |
| 6 | (10. 1. 2. 0/24) | 60 |
| 7 | (30. 0. 0. 0/8) | 70 |

FIG. 37

| ADDRESS | DESTINATION FIELD | TRANSMISSION INTERFACE NUMBER | POINTER TO TREE NODE |
|---|---|---|---|
| 1 | (10. 0. 0. 0/8) | 10 | 1 |
| 2 | (10. 2. 0. 0/16) | 20 | 2 |
| 3 | (10. 2. 3. 0/24) | 30 | 3 |
| 4 | (20. 0. 0. 0/8) | 40 | 4 |
| 5 | (0. 0. 0. 0/0) | 50 | 5 |
| 6 | (10. 1. 2. 0/24) | 60 | 6 |
| 7 | (30. 0. 0. 0/8) | 70 | 7 |

FIG. 38

| ADDRESS | DESTINATION FIELD | TRANSMISSION INTERFACE NUMBER | POINTER TO TREE NODE |
|---|---|---|---|
| 1 | NO ENTRY | | |
| 2 | NO ENTRY | | |
| 3 | NO ENTRY | | |
| 4 | NO ENTRY | | |
| 5 | (30. 0. 0. 0/8) | 70 | 7 |

FIG. 39

| ADDRESS | DESTINATION FIELD | TRANSMISSION INTERFACE NUMBER | POINTER TO TREE NODE |
|---|---|---|---|
| 1 | (10. 0. 0. 0/255. 0. 0. 0) | 10 | 1 |
| 2 | (10. 1. 2. 0/255. 255. 255. 0) | 60 | 6 |
| 3 | (10. 2. 0. 0/255. 255. 0. 0) | 20 | 2 |
| 4 | (10. 2. 3. 0/255. 255. 255. 0) | 30 | 3 |
| 5 | (30. 0. 0. 0/255. 0. 0. 0) | 70 | 7 |

FIG. 40

| ADDRESS | DESTINATION FIELD | TRANSMISSION INTERFACE NUMBER | POINTER TO TREE NODE |
|---|---|---|---|
| 1 | NO ENTRY | | |
| 2 | (10. 1. 2. 0/255. 255. 255. 0) | 60 | 6 |
| 3 | NO ENTRY | | |
| 4 | NO ENTRY | | |
| 5 | (30. 0. 0. 0/255. 0. 0. 0) | 70 | 7 |

FIG. 41

| ADDRESS | DESTINATION FIELD | TRANSMISSION INTERFACE NUMBER | POINTER TO TREE NODE |
|---|---|---|---|
| 1 | (20. 0. 0. 0/255. 0. 0. 0) | 40 | 4 |
| 2 | (10. 1. 2. 0/255. 255. 255. 0) | 60 | 6 |
| 3 | NO ENTRY | | |
| 4 | NO ENTRY | | |
| 5 | (30. 0. 0. 0/255. 0. 0. 0) | 70 | 7 |

FIG. 42

| ADDRESS | DESTINATION FIELD | TRANSMISSION INTERFACE NUMBER |
|---|---|---|
| 1 | (10. 0. 0. 0/8) | 1 |
| 2 | (10. 2. 0. 0/16) | 2 |
| 3 | (10. 2. 3. 0/24) | 3 |
| 4 | (20. 0. 0. 0/8) | 4 |
| 5 | (0. 0. 0. 0/0) | 5 |
| 6 | (10. 1. 2. 0/18) | 6 |

FIG. 43

| ADDRESS | DESTINATION FIELD | TRANSMISSION INTERFACE NUMBER |
|---|---|---|
| 1 | (10. 0. 0. 0/8) | 1 |
| 2 | (10. 2. 0. 0/16) | 2 |
| 3 | (10. 2. 3. 0/24) | 3 |
| 4 | (20. 0. 0. 0/8) | 4 |
| 5 | (0. 0. 0. 0/0) | 5 |
| 6 | (10. 1. 2. 0/18) | 6 |

ROUTER WITH A CACHE HAVING A HIGH HIT PROBABILITY

BACKGROUND OF THE INVENTION

1. Field of the Invention

The present invention relates to a routing technique for use in a router with a cache, and more particularly to a router with a cache which is capable of raising a cache hit probability and reducing the capacity of the cache.

2. Description of the Related Art

A router for connecting plural terminals to plural networks needs to perform transfer or forwarding of a block (packet) of communication information in order to achieve communications over different networks. In each router, a packet inputted from a connected network is received by an interface and a forwarding table possessed by the router is searched according to a final destination address contained in the received packet to determine a number of a transmission interface from which the packet should be sent to a next-hop router or the destination. In such a way, the packet forwarding is performed.

A conventional routing method for rapidly determining a transmission interface by using a cache table provided in the router (hereinafter referred to as "router with a cache") will be described.

A router having a conventional cache, as disclosed in Japanese Patent Application Laid-Open No. 6-261078, has a forwarding table, a forwarding table retrieval system for retrieving the forwarding table, and a cache table for exact matching retrieval. First, a structure and a retrieval method of each table will be described.

As shown in FIG. 1, the forwarding table has a pair of a destination field and a transmission interface number field. The destination field specifies a string of consecutive bits in the direction from the uppermost bit thereof toward a lower-order bit, which indicates a network address. The length of the bit string in called a prefix length and the bit string is called a prefix. To represent such a prefix, the destination field consists of two pieces of information: Prefix bit string and Prefix length.

The prefix bit string is a bit string having the same bit length as address and stores a bit string which is required to be specified continuously from the uppermost bit. Although bits not specified may store any bit, it is assumed hereinafter that bit "0" is stored.

The prefix length is the number of bits required to be specified as the prefix from the uppermost bit of the prefix bit string.

For example, in the case where the network address is 32-bit address, when a prefix of 10000000 01000000 (separated every 8 bits by a space) is required to be specified from the uppermost bit, the prefix bit string is 10000000 01000000 00000000 00000000 (separated every 8 bits by a space) and the prefix length is 16. In a following description, a 32-bit string is frequently separated every 8 bits into four blocks such that each block is expressed by a decimal number and the four blocks are indicated by separating with dots (dotted decimal notation). Further, in the cage of 32-bit network address, sometimes the destination field (prefix) is expressed by decimal notation with dots indicating a prefix bit string followed by the prefix length separated with "/". For example, the prefix of the above 32 bits is expressed as 129.64.0.0/16.

Further, the prefix length may be expressed in mask bit string. According to this method, the mask bit string is a bit string consisting of consecutive bits of 1 for the prefix length in the direction from the uppermost bit toward a lower-order bit of the network address and the remaining part consisting of consecutive bits of 0. In the above example, the mask bit string is 11111111 11111111 00000000 00000000 (separated every 8 bits by a space). A transmission interface number to which a packet should be transferred is written in the transmission interface number field of the forwarding table. As to a retrieval method of the forwarding table, a method called longest prefix match retrieval (hereinafter referred to as LPM) is employed. In this retrieval, for all entries, the destination address of a packet is compared with a prefix registered in the destination field of the forwarding table. In this comparison, it is determined whether the following bit strings (1) and (2) match with each other.

The bit string (1) is a bit string of consecutive bits corresponding to the prefix length of an entry, extracted from the destination address of a pocket in the direction from the uppermost bit toward a lower-order bit.

The bit string (2) is a bit string of consecutive bits corresponding to the prefix length of an entry, extracted from the prefix bit length of the entry in the direction from the uppermost bit toward a lower-order bit.

Although there is a possibility that plural entries in which the bit strings (1) and (2) match with each other may exist in the forwarding table, an entry having the longest prefix length of them is an entry which is a result of the LPM retrieval.

The cache table has a destination address field and a transmission interface number field. Network addresses are written in the destination address field. In the transmission interface number field, transmission interface numbers are written and a packet whose destination address is the network address written in a corresponding destination address field is forwarded to that interface number. Upon retrieval, a destination address is given as a retrieval key and the cache is searched for an entry whose destination address field completely matches with the retrieval key.

In a router having a conventional cache, a process for determining a transmission interface number is carried out in the following manner. When a packet arrives at the router, the destination address of the packet is picked out. Then, with the destination address as a retrieval key, exact matching retrieval is carried out about the cache table. When a match is found, the interface number to which that packet should be transferred is obtained from the transmission interface number field of that entry. When no match is found, the forwarding table retrieval system carries out the LPM retrieval described above based on the destination field of the packet so as to obtain the transmission interface number.

When the forwarding table is retrieved, the destination address of the packet and the transmission interface number obtained from the table retrieval are stored in the cache in pair. In the aforementioned router having the conventional cache, a previously retrieved destination address of a packet and a result of the LPM retrieval are stored in a cache which can provide retrieval at higher speeds than the forwarding table retrieval. In the case where a packet having the same destination address arrives, a transmission interface number can be obtained by only cache retrieval. As a result, by omitting the forwarding table retrieval which takes longer than the cache retrieval, the interface-number determining processing, that is, path determining processing, is accelerated.

In the conventional cache as described above, however, the destination address of a packet is stored in the cache and the exact matching retrieval is carried out. Thus, the destination address which matches with the cache entry is only one. Therefore, the cache hit probability is low. When no hit is found in the cache, the forwarding table needs to be retrieved. Thus, it takes long until the transmission interface is determined and there is a problem that the packet transmission performance of the router is reduced. Further, when transmission is carried out to N destination addresses through a router, N cache entries are needed in order that a hit for each of these packets can be found in the cache. In other words, the number of cache entries must be identical to that of destination addresses. Thus, when the number of transmission terminals is large, it is necessary to mount a large capacity cache proportional thereto, and consequently, a circuit area of the router increases, thereby leading to an increase of production cost.

SUMMARY OF THE INVENTION

Accordingly, an object of the present invention is to provide a router having a cache therein, in which the entry hit probability of the cache is increased and a probability of carrying out forwarding table retrieval, which takes longer than the cache retrieval, is lowered, thereby decreasing packet processing time of the router to improve the packet processing performance of the router.

Another object of the present invention is to provide a router with a cache which allows a circuit area of the router to be reduced by decreasing the capacity of the cache without decreasing the entry hit probability of the cache.

According to an aspect of the present invention, a router for determining a forwarding direction of a received packet by referring to a cache table and a forwarding table depending on a destination address of the received packet, comprises:

a forwarding table retriever for retrievably storing a plurality of entries;

a cache table retriever for retrievably storing a plurality of cache entries, the cache table retriever capable of retrieval using a different mask for each cache entry;

a cache address determiner for determining a cache address at which a cache entry is registered; and a cache prefix length determiner for determining a cache prefix length as a length of upper bits of the destination address of the received packet which are not masked by a corresponding mask.

The cache prefix length determiner determines a maximum cache prefix length based on cache entries. Alternatively, the cache prefix length determiner determines an optimum cache prefix length based on cache entries.

According to another aspect of the present invention, a router for determining a forwarding direction of a received packet by referring to a cache table and a forwarding table depending on a destination address of the received packet, comprises:

a forwarding table retriever for retrievably storing a plurality of entries;

a cache table retriever for retrievably storing a plurality of cache entries, the cache table retriever capable of longest prefix match (LPM) retrieval;

a cache address determiner for determining a cache address at which a cache entry is registered; and a table manager for managing the forwarding table in form of tree topology to determine which entry is to be registered into the cache table and to be deleted from the cache table based on a result of retrieval on the forwarding table.

According to still another aspect of the present invention, a router for determining a forwarding direction of a received packet by referring to a cache table and a forwarding table depending on a destination address of the received packet, comprises:

a forwarding table retriever for retrievably storing a plurality of entries;

a cache table retriever for retrievably storing a plurality of cache entries, the cache table retriever capable of longest prefix match (LPM) retrieval;

a cache address determiner for determining a cache address at which a cache entry is registered; and a cache prefix length determiner for determining a cache prefix length used when registering the destination address of the received packet into the cache table.

As described above, according to the present invention, (1) a cache capable of carrying out matching retrieval with a different mask for each entry or (2) a cache capable of carrying out longest prefix match (LPM) is used as a cache table capable of retrieving more rapidly than the forwarding table in a router. Therefore, a cache entry which hits plural destination addresses with only a single cache entry can be registered in the cache.

The forwarding table is searched using the destination address of a received packet as a key and a result of the retrieval is registered in the cache. To obtain a proper forwarding direction when the cache is searched, in the case of (1), a cache entry with a mask in registered using a means for obtaining the longest cache prefix length as a length of a not-masked portion of the cache entry or a means for obtaining an optimum cache prefix length. In the case of (2), the cache entry is registered using a means for determining an entry of the forwarding table to be registered into the cache table based on an entry hit by the retrieval on the forwarding table.

Upon registration, at which address of the cache table an entry should be registered is determined using a means for determining the cache address for registering a cache entry into the cache. Since a cache entry which hits plural destination addresses with a single cache entry can be registered as described above, according to the present invention, the cache hit probability can be raised.

In the case where transmission is carried out to plural different destination addresses through a router, in the conventional router, the same number of the cache entries as that of the different destination addresses is needed to make these destination addresses found in the cache. However, according to the present invention, the cache entry capable of hitting plural destination addresses can be registered with a single cache entry. Therefore, the cache can be hit by these destination packets with a smaller entry number than conventionally. Thus, the cache capacity can be reduced without lowering the cache hit probability, so that the circuit area of the router can be reduced.

As a means for determining a cache address for registering a cache entry in the cache, the entire address region is divided into a resident region and an updating region. When a means for determining the cache address from the updating region is used, the router manager can store an entry often used in the forwarding table onto the resident region. Further, those entries are never deleted when the other cache entry is registered. Therefore, the cache hit probability can be further raised.

BRIEF DESCRIPTION OF THE DRAWINGS

FIG. 27 is a diagram showing an example of the contents associated memory with mask function;

FIG. 28 is a diagram showing an example of the forwarding table;

FIG. 29 is a diagram showing an example of contents of a forwarding table;

FIG. 30 is a diagram showing an example of contents of a cache table with mask;

FIG. 31 is a diagram showing an example of contents of a cache table with mask;

FIG. 32 is a diagram showing an example of contents of a cache table with mask;

FIG. 33 is a diagram showing an example of contents of a cache table with mask;

FIG. 34 is a diagram showing an example of contents of the forwarding table;

FIG. 35 is a diagram showing an example of contents of a memory with LPM function;

FIG. 36 is a diagram showing an example of contents of the forwarding table;

FIG. 37 is a diagram showing an example of contents of the forwarding table;

FIG. 38 is a diagram showing an example of contents of the LMP cache table;

FIG. 39 is a diagram showing an example of contents of the LMP cache table;

FIG. 40 is a diagram showing an example of contents of the LMP cache table;

FIG. 41 is a diagram showing an example of contents of the LMF cache table;

FIG. 42 is a diagram showing an example of contents of the forwarding table;

FIG. 43 is a diagram showing an example of contents of the forwarding table.

DESCRIPTION OF THE PREFERRED EMBODIMENTS

Figure 1:
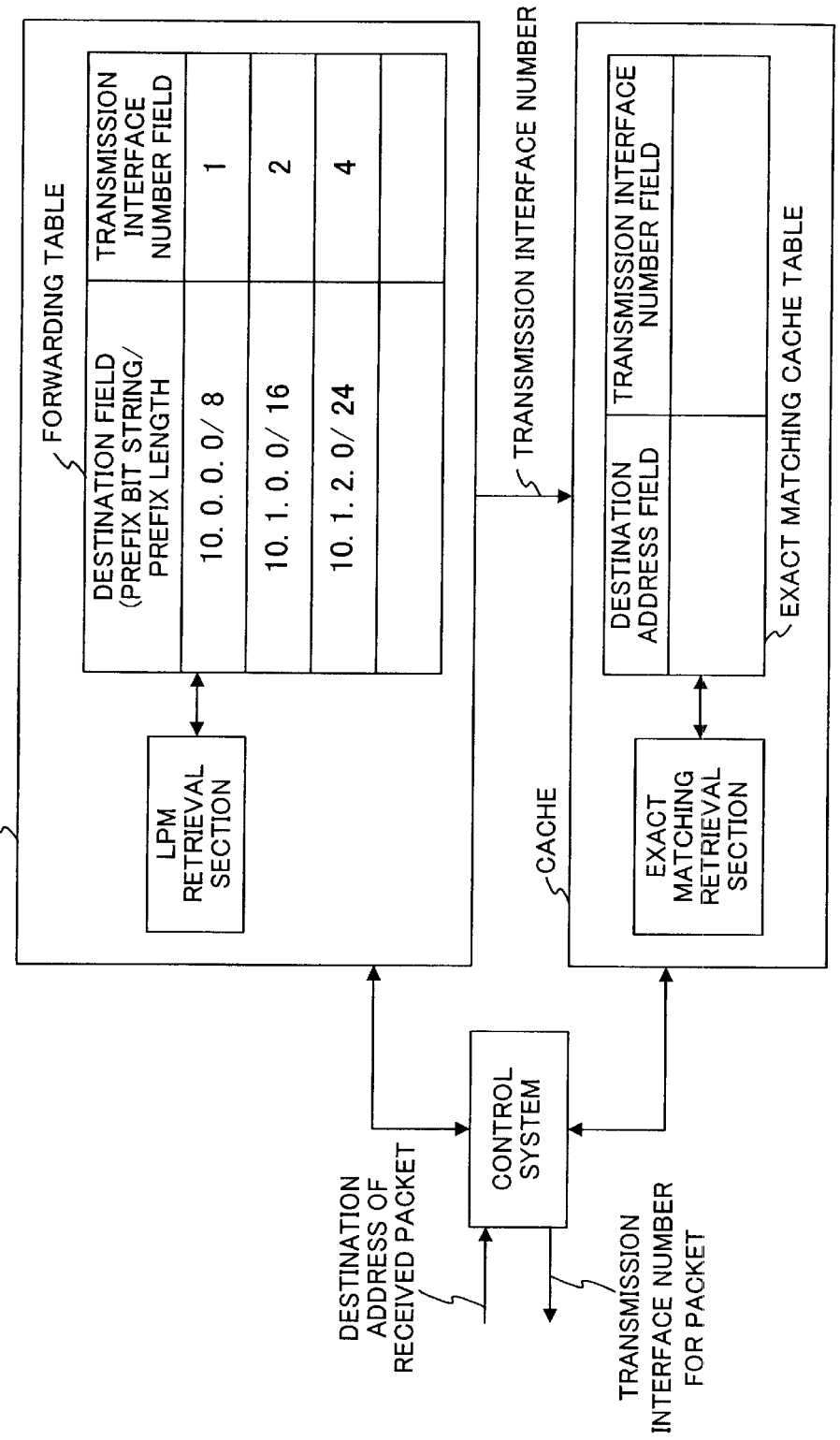
FIG. 1 is a configuration diagram of a conventional art.

First of all, two terms which are used in the present invention are defined: Maximum cache prefix length and Optimum cache prefix length.

Maximum Cache Prefix Length

The destination field of the forwarding table specifies a set of the network addresses. For example, the destination field of 10.5.6.0/24 in the forwarding table indicates a ser of 256 network addresses such as 10.5.6.0, 10.5.6.1, ... 10.5.6.255. This set is called address set of the entry. When the address set of an entry A is included by the address set of an entry B (including coincidence), it is said that the entry A is included by the entry B. A is included by B when the following two inclusion conditions are satisfied:

1) Inclusion condition 1: the prefix length of A is equal to or longer than the prefix length of B; and 2) Inclusion condition 2: the prefix bit string of A matches with the prefix bit string of B in a portion as long as the prefix length of B from the uppermost bit.

Since the destination field specifies a bit string of consecutive bits from the uppermost bit toward a lower-order bit in a network address, sets specified by any two prefixes have such a relation that any one includes the other or they have no common portion.

When attention in paid to an entry in the forwarding table, a prefix length of an entry having the longest prefix length among the other entries included by that entry is called maximum cache prefix length. When there is no entry included, the prefix length of that entry is called maximum cache prefix length. For example, when the destination address of the forwarding table is 10.0.0/8, 10.2.0.0/16, 10.2.3.0/24, 20.0.0.0/8, the maximum cache prefix length of a head 10.0.0.0/8 is 24 and the maximum cache prefix length of fourth 20.0.0.0/8 is 8.

Optimum Cache Prefix Length

A portion restricted by the prefix length in the direction from the uppermost bit forward lower-order bits in a prefix bit string of each entry in the forwarding table is called prefix. Further, with a bit string of a network address and a prefix as a pair, these two bit strings are sequentially compared in the direction from the uppermost bit toward lower-order bits. When there is a match, the number of matches is called an upper bit match count.

When a network address (here, A) is given, the forwarding table to searched by an LPM retrieval section and the optimum cache prefix length is determined by the following processing.

The upper bit match count between the network address A and the prefix indicated by a destination field for each entry in the forwarding table is obtained and then the maximum upper bit match count among them is obtained. Further, it is also determined whether there are plural entries having the maximum upper bit match count. And the optimum cache prefix length is determined as follows:

Case 1) in the case where the maximum upper bit match count is larger than the prefix length of an entry hit by the LPM retrieval, the maximum upper bit match count plus 1 is defined as the optimum cache prefix length; and Case 2) in the case where the maximum upper bit match count is the same as the prefix length of an entry hit by the LPM retrieval (a case in which the maximum upper bit match count is shorter than the prefix length never occurs, because in an entry hit by the LPM retrieval, the upper bit match count is the prefix length of that entry), if there are plural entries having the maximum upper bit match count, then the maximum upper bit match count plus 1 is defined as the optimum cache prefix length and, if there are not plural entries, then the maximum upper bit match count is defined as the optimum cache prefix length.

Taking as an example a case where an 8-bit network address and the destination of an entry in the forwarding table is as follows:

Entry 1: prefix bit string 11100000 prefix length 3;
Entry 2: prefix bit string 10110000 prefix length 4;
Entry 3: prefix bit string 10111000 prefix length 5;
Entry 4: prefix bit string 10111100 prefix length 6;
Entry 5: prefix bit string 11111100 prefix length 6: and
Entry 6: prefix bit string 10010000 prefix length 4.

In this case, when a network address 10110001 is given, an entry hit by the LPM retrieval is the Entry 2.

The upper bit match count of each entry is as follows:
Entry 1: 1;
Entry 2: 4;
Entry 3: 4;
Entry 4: 4;
Entry 5: 1; and
Entry 6: 2.

Therefore, the entries 2, 3, 4 provide the maximum upper bit match count. In this case, the maximum upper bit match count is 4, which coincides with the prefix length of the hit Entry 2. Therefore, this corresponds to the above-mentioned case 2). Because there are plural entries whose maximum upper bit match counts are the same, 4+1=5 is the optimum cache prefix length.

When a network address 11111111 is given in the same forwarding table, the Entry 1 is hit as a result of the LPM retrieval. The upper bit match count is as follows:
Entry 1: 3;
Entry 2: 1;
Entry 3: 1;
Entry 4: 1;
Entry 5: 6; and
Entry 6: 1.

The maximum upper bit match count is 6. Because this is larger than the prefix length or the hit Entry 1, this corresponds to the case 1). The optimum cache prefix length is 6+1=7.

When a network address 10011111 in the same forwarding table, the Entry 6 is hit as a result of the LPM retrieval. The upper bit match count is as follows:
Entry 1: 1;
Entry 2: 2;
Entry 3: 2;
Entry 4: 2;
Entry 5: 1; and
Entry 6: 4.

The maximum upper bit match count is 4. This is the same as the prefix length of the hit Entry 6 and corresponds to the case 2). Because there is only an entry having the maximum upper bit match count, the optimum cache prefix length is 4 which is the maximum upper bit match count.

Next, the preferred embodiments of the present invention will be described in detail with reference to the accompanying drawings.

FIRST EMBODIMENT

Figure 2:
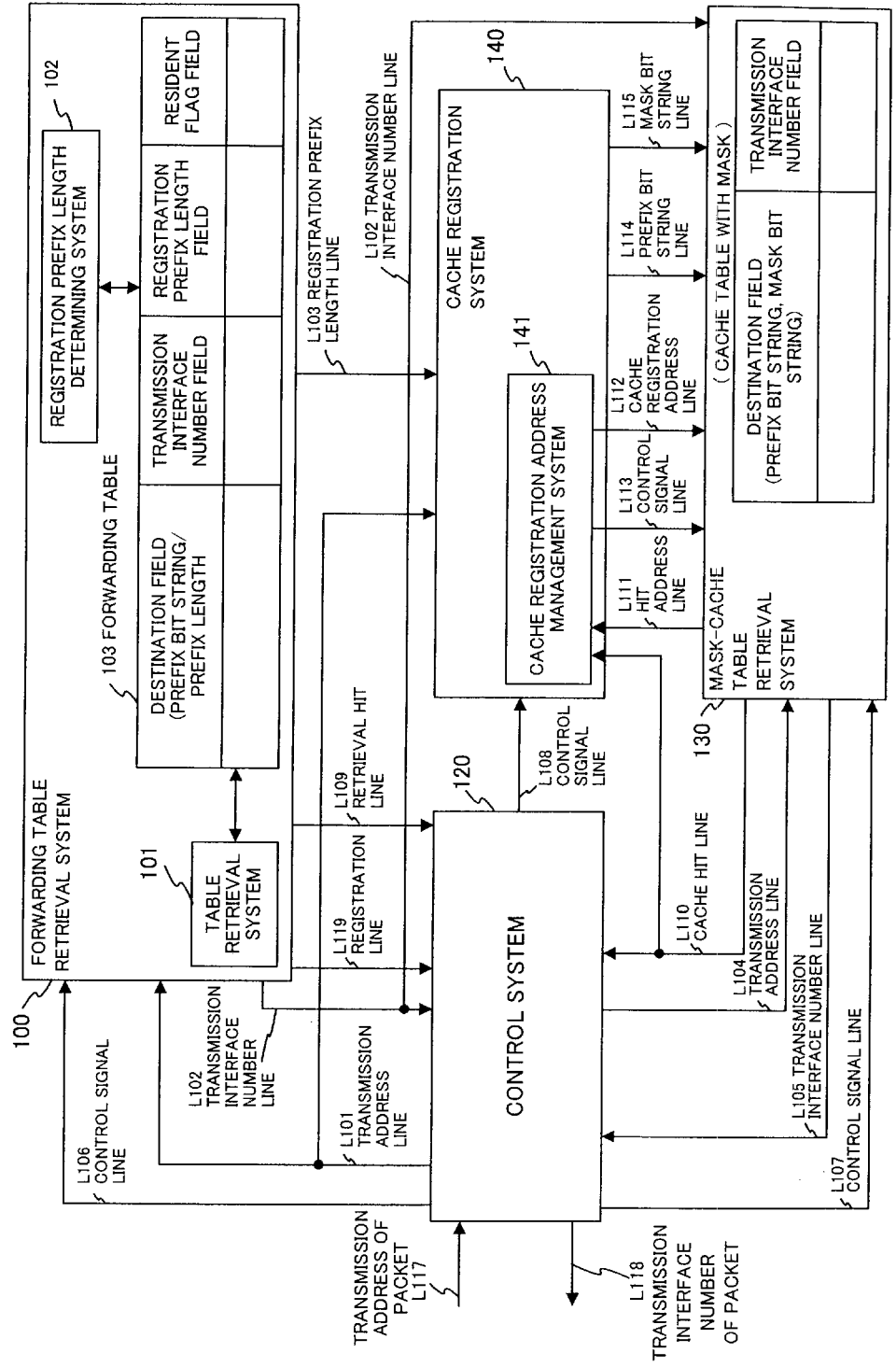
FIG. 2 is a configuration diagram of a route determining device for use in a router with a cache according to a first embodiment of the present invention.

FIG. 2 is an entire structure diagram of a route determining system according to a first embodiment of the present invention. The route determining system includes a forwarding table retrieval system 100, a control system 120, a mask-cache table retrieval system 130, and a cache registration system 140. The details of each component system as shown in FIG. 2 will be described.

Forwarding Table Retrieval System 100

The forwarding table retrieval system 100 includes a table retrieval system 101, a registration prefix length determining system 102, and a forwarding table 103. The table retrieval system 101 performs retrieval using the forwarding table 103 for routing. The forwarding table 103 has a destination field, a transmission interface number field, a registration prefix length field, and a resident flag field. The registration prefix length field is used for registering an entry in a mask-cache table and the resident flag field is used to indicate an entry resident in the cache.

As for a value of the registration prefix length field, when the forwarding table 103 is stored, a maximum cache prefix length is calculated by the registration prefix length determining system 102 and stored onto the registration prefix length field. When a control signal line 106 is made active, a destination field of the forwarding table 103 is retrieved based on the packet destination address inputted from the destination address line L101. A transmission interface number and a registration prefix length obtained as a result of the retrieval are outputted to the control system 120 through a transmission interface number line L102 and registration prefix length line L119, respectively. In the case of the resident flag reset to 0, the registration line L139 is made active, and in the case of the resident flag set to 1, the registration line L119 is not made active.

Control System 120

With a destination address (indicated by L117) of the packet received by the router as input, the control system 120 controls the forwarding table retrieval system 100, the cache registration system 140 and the mask-cache table retrieval system 130 so as to determine a transmission interface number for forwarding a packet and output the transmission interface number as indicated by L118.

Mask-cache Table Retrieval System 130

The mask-cache table retrieval system 130 has a cache table with mask (hereinafter, called mask-cache table) and a function of retrieving. The mask-cache table has a destination field and a transmission interface number field. A pair of prefix bit string and mask bit string for indicating a network address is stored in the destination field. The mask-cache table retrieval system 130 has a function of searching the mask-cache table. This is comprised of, for example, a content associative memory with mask function as described in Japanese Patent Application Laid-Open No. 1-220923 and a RAM (random access memory). Upon retrieval, when the control signal line L107 is made active, a bit string indicating the destination address of a packet is fetched from tho control system 120 through a destination address line L104 and masked matching retrieval is carried out for each entry. In a bit portion (to be compared) corresponding to the mask bit string in which 1 stands in the prefix bit string in the destination field, the prefix bit string is compared with a bit string indicating the destination address. When there is a match, the cache hit line L110 is set to a hit-indicating value and the transmission interface number of a matched entry is outputted to the control system 120 through a transmission interface number line L105.

Cache Registration System 140

The cache registration system 140 performs the registration of an entry into the mask-cache table. Based on a registration prefix length inputted from the forwarding table retrieval system 100 through a registration prefix length line L103, prefix bit string, mask bit string, cache registration address, which are information necessary for registering cache entry in the mask-cache table retrieval system 130, are outputted to the mask-cache table retrieval system 130 through the lines L114, L115, L112, respectively. Further, the cache registration system 140 manages in-use addresses and unused addresses in the cache table.

Details of Component Systems

Figure 3:
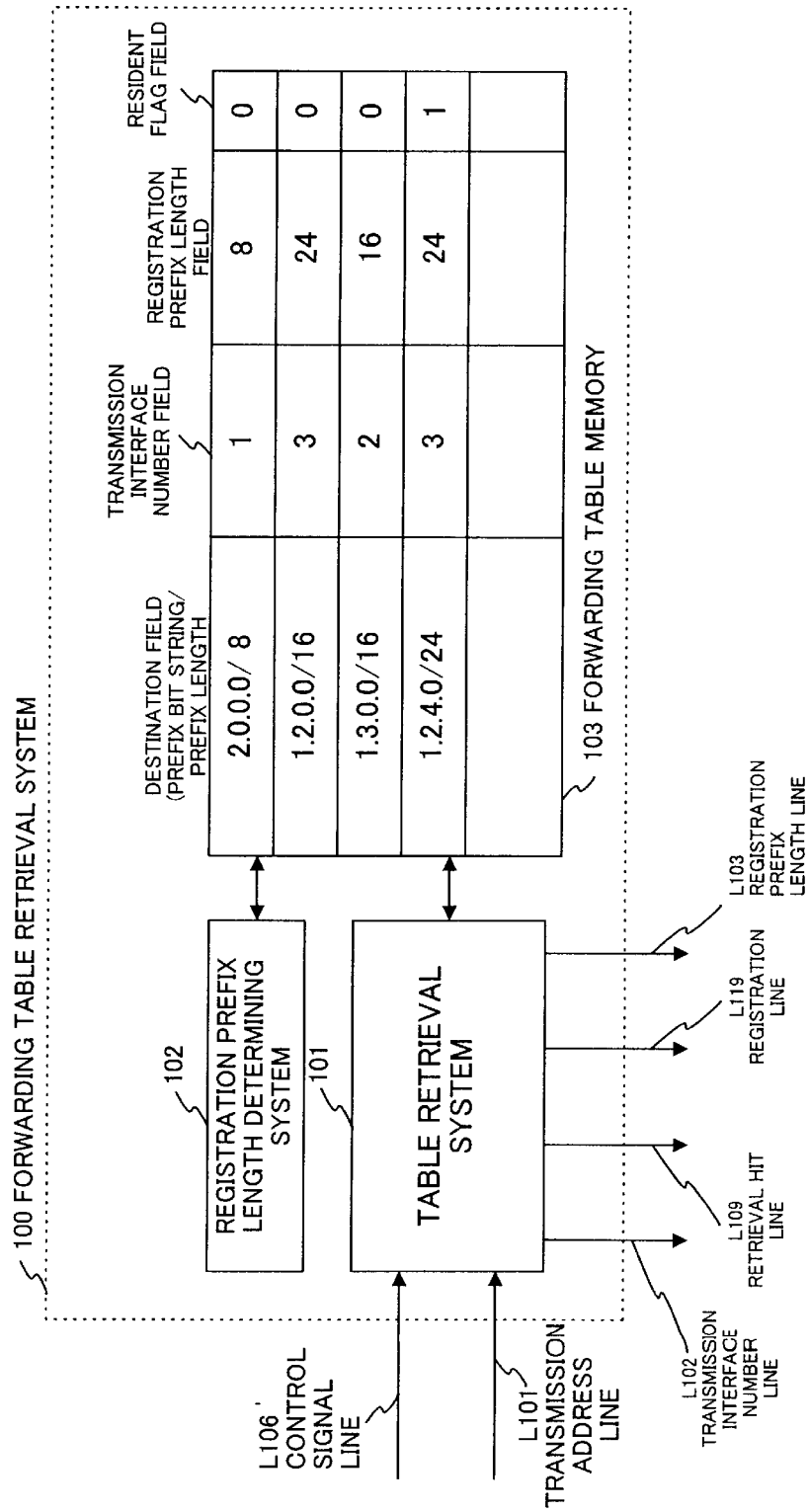
FIG. 3 is a detailed configuration diagram of a forwarding table retrieval system 100 in the first embodiment.

FIG. 3 shows a detailed structure of the forwarding table retrieval system 100. The forwarding table retrieval system comprises the forwarding table memory 103 for storing a forwarding table of the router, the table retrieval system 101 for retrieving the forwarding table, and the registration prefix length determining system 102.

The forwarding table memory 103 accommodates the forwarding table. This forwarding table has the destination field and transmission interface number field similar to the conventional forwarding table, and further has the registration prefix length field and the resident flag field. The destination field includes a prefix bit string indicating a prefix and a prefix length field indicating a prefix length of the prefix bit string.

When the control signal line L106 is made active, the table retrieval system 101 performs the LPM retrieval in the destination field of the forwarding table stored in the forwarding table memory 103 based on the destination address of a packet inputted from the destination address line L101. When a hit is found, the retrieval hit line L109 is set to a hit indicating value which indicates that an entry is found. The transmission interface number of the found entry is outputted to the transmission interface number line L102 and the registration prefix length is outputted to the registration prefix length line L103. When no hit is found by the LPM retrieval, the retrieval hit line L109 is set to a no-hit indicating value indicating that no hit is found. When the resident flag of the entry obtained as a result of retrieval is 0, the registration line L119 is made active. Otherwise, it is not made active. In the table retrieval system 101, the system for LPM retrieving the destination field based on the destination address of the packet can be achieved using the same LPM retrieval system as the conventional router.

Based on the destination field stored in the forwarding table memory 103, the registration prefix length determining system 102 obtains a value of registration prefix length field and stores it. That operation will be described here. First, it is assumed that the destinations and transmission interface numbers of all entries on the forwarding table of the router are stored in the destination field and transmission interface number field, respectively, of the forwarding table memory 103. The registration prefix length determining system 102 uses the forwarding table to obtain a maximum cache prefix length (defined before) for each of the entries in succession from the head of the table and stores it in the registration prefix length field as a value of the registration prefix length. Determination of the value of the registration prefix length (that is, value of maximum cache prefix length) is carried out in the following manner. The registration prefix length decision process will be described with reference to a flowchart of FIG. 7.

A prefix bit string and prefix length of the destination field of an entry whose registration prefix length is requested to be obtained (hereinafter, such an entry is referred to as E) are picked up and a value of the registration prefix length (hereinafter referred to as PL) is set to the prefix length of the entry as its initial value. Next, the following decision steps Z1 to Z3 and the updating step Z4 are carried out for respective entries except for E in the forwarding table successively from the head of the table. In the following description, an entry in process is called CE.

Figure 7:
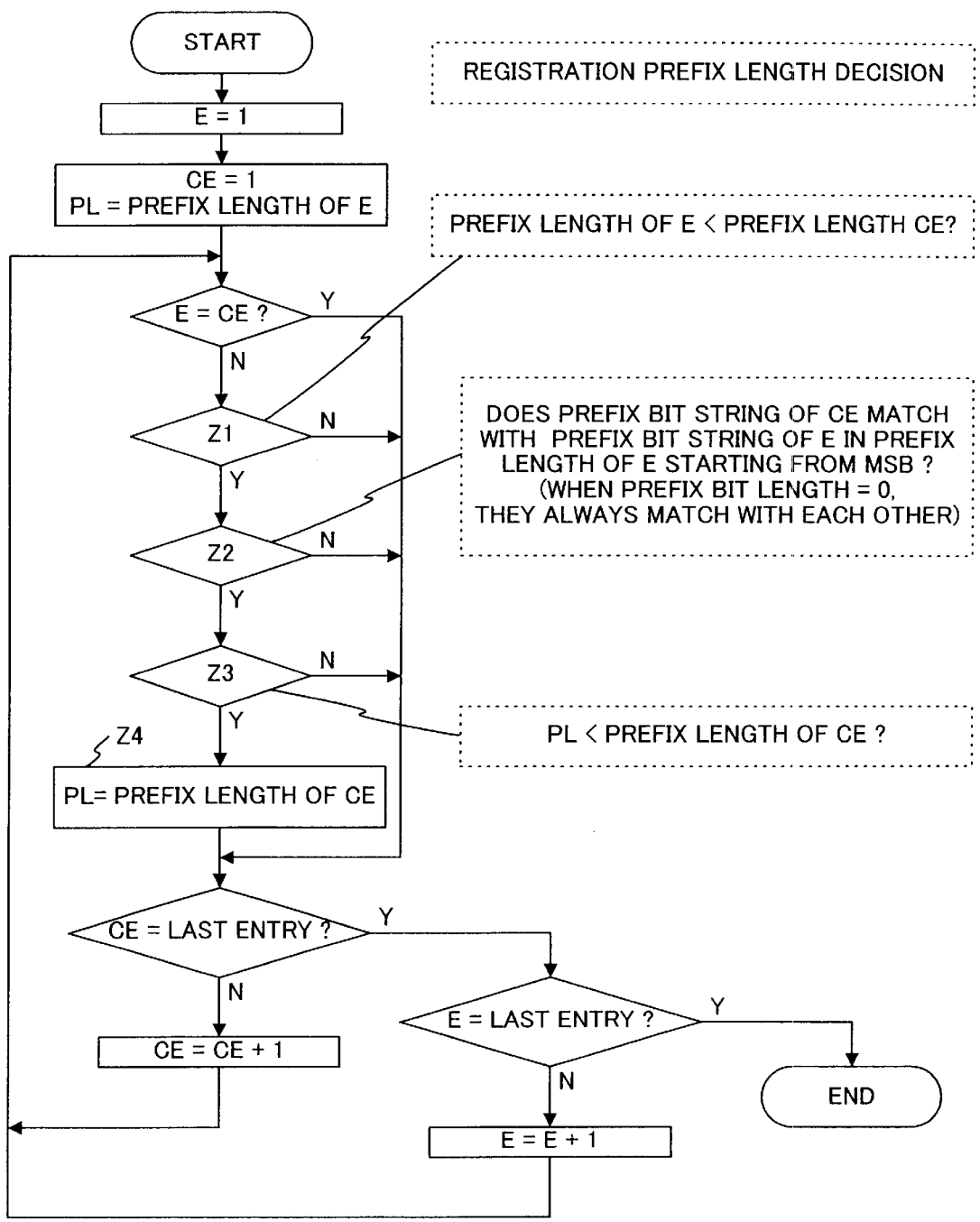
FIG. 7 is a flow chart showing a registration prefix length determining processing in a registration prefix length determining system 102 in the first embodiment.

In FIG. 7,

Z1: Is the value of the prefix length of E smaller than the value of the prefix length of CE (except that they match with each other)?;

Z2: Does the prefix bit string of CE match with the prefix bit string of E in the prefix length of E starting from the uppermost bit? (when the prefix bit length is 0, they always match with each other);

Z3: Is the prefix length of PL larger than that of CE (except when they are equal)?; and Z4: when all the decision steps Z1 to Z3 are affirmative (Y), the prefix length of PL is updated to the prefix length of CE. Otherwise, nothing is done.

When this processing reaches last of the table, a value of PL is a value of the registration prefix length of E. The longest cache prefix length is obtained by this processing. This system is achieved easily with a counter, a comparator, a bit string matching discriminator and a register. The processing for determining a registration prefix length of each entry is called "registration prefix length decision processing". FIG. 7 shows this processing by a flow chart.

Figure 4:
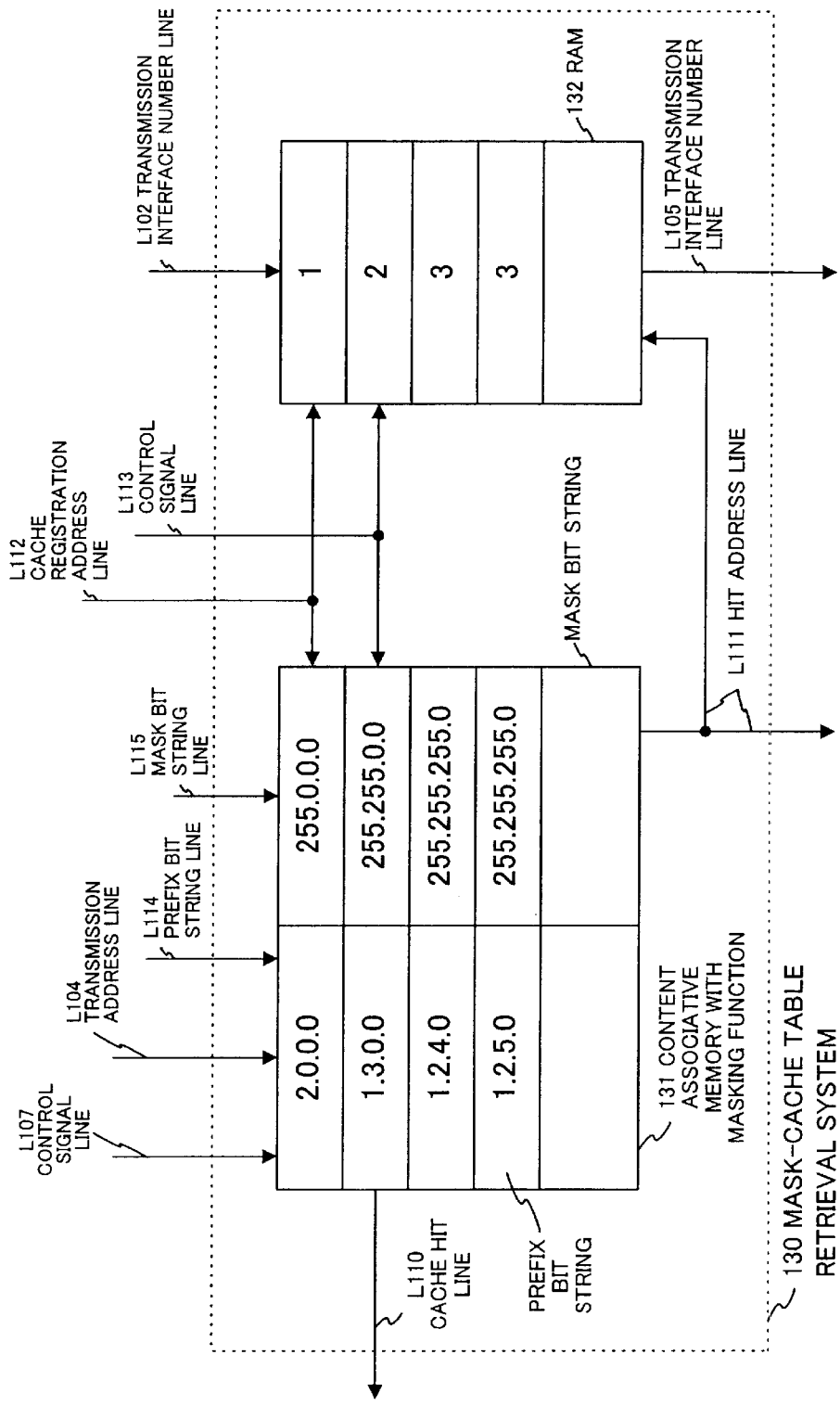
FIG. 4 is a detailed configuration diagram of a mask-cache table retrieval system 130 in the first embodiment.

FIG. 4 is a detailed diagram of the mask-cache table retrieval system 130. The mask-cache table retrieval system comprises a content associative memory with masking function (hereinafter, called mask-content associative memory 131) and a RAM (random access memory) 132. In the mask-content associative memory 131, an entry is registered therein with prefix bit string and mask bit string in pair for each address. When a retrieval key is provided, a prefix bit string masked by the mask bit string is compared with a bit string of the retrieval key masked by the mask bit string and the address of a matching entry is outputted.

For example, consider that three entries as shown in FIG. 27 are registered in a 5bit-wide mask-content associative memory and 11011 is given as a retrieval key. For Address 1, a bit string obtained by masking the data bit string with the mask bit string is 10100 while a bit string obtained by masking the retrieval key with the mask bit is 11000. When they are compared, they do not match with each other. Likewise, for Address 2, 11010 is compared with 11011 and therefore they do not match with each other. For Address 3, 11000 is compared with 11000 and they match with each other. Thus, as a result of retrieval, the address 3 of the matching entry is outputted. When there are plural matching entries, the address of any one of them is outputted.

The mask-cache table has the destination field and the transmission interface number field. The destination field includes a pair of a prefix bit string indicating a network address and a mask bit string. Each entry of the mask-cache table stores its prefix bit string as a data bit string of the mast-content associative memory 131 and a mask bit string as a data bit string of the mask-content associative memory 131. A transmission interface number is stored onto the RAM 132 at the same address as the address used for storing the destination field (prefix bit string and mask bit string) in the associative memory 131. In FIG. 4, the network address is expressed in 32-bit width and the prefix bit string and mask bit string are expressed in decimal number with dots. For example, a prefix bit string of 2.1.0.0 expresses a bit string of 00000010 00000001 00000000 00000000 (a space is given every 8 bits). A mask bit string of 255.255.0.0 expresses a bit string of 11111111 11111111 00000000 00000000 (a space is given every 8 bits).

When the control signal line L113 is made active, the entry is registered in the mask-cache table. This procedure is carried out in the following steps. In the mask-content associative memory 131, a prefix bit string inputted from the prefix bit string line L114 and a mask bit string inputted from the prefix bit string line L115 are stored at an address indicated by the cache registration address line L112. At the same time, a transmission interface number inputted from the transmission interface number line L102 is stored in the RAM 132 at an address (the same address as when stored in the mask-content associative memory 131) indicated by the cache registration address line L112.

When the control signal line L107 is made active, retrieval is carried out. A destination address is inputted as a retrieval key into the mask-content associative memory 131 through the destination address line L104. The mask-content associative memory 131 compares a prefix bit string of the destination field with the bit string of the destination address for each entry as long as the corresponding mask bit is 1. When a hit is found (there is a matching entry), the address of the mask-content associative memory 131 registering the hit entry is outputted to the hit address line L111. At the same time, the cache hit line L110 is set to a set value. Then, in the RAM 132, a transmission interface number written at the address indicated by the hit address line L111 is read out and that value is outputted to the transmission interface number line L105. When no hit is found, the cache hit line L110 is set to a non-hit value.

Figure 5:
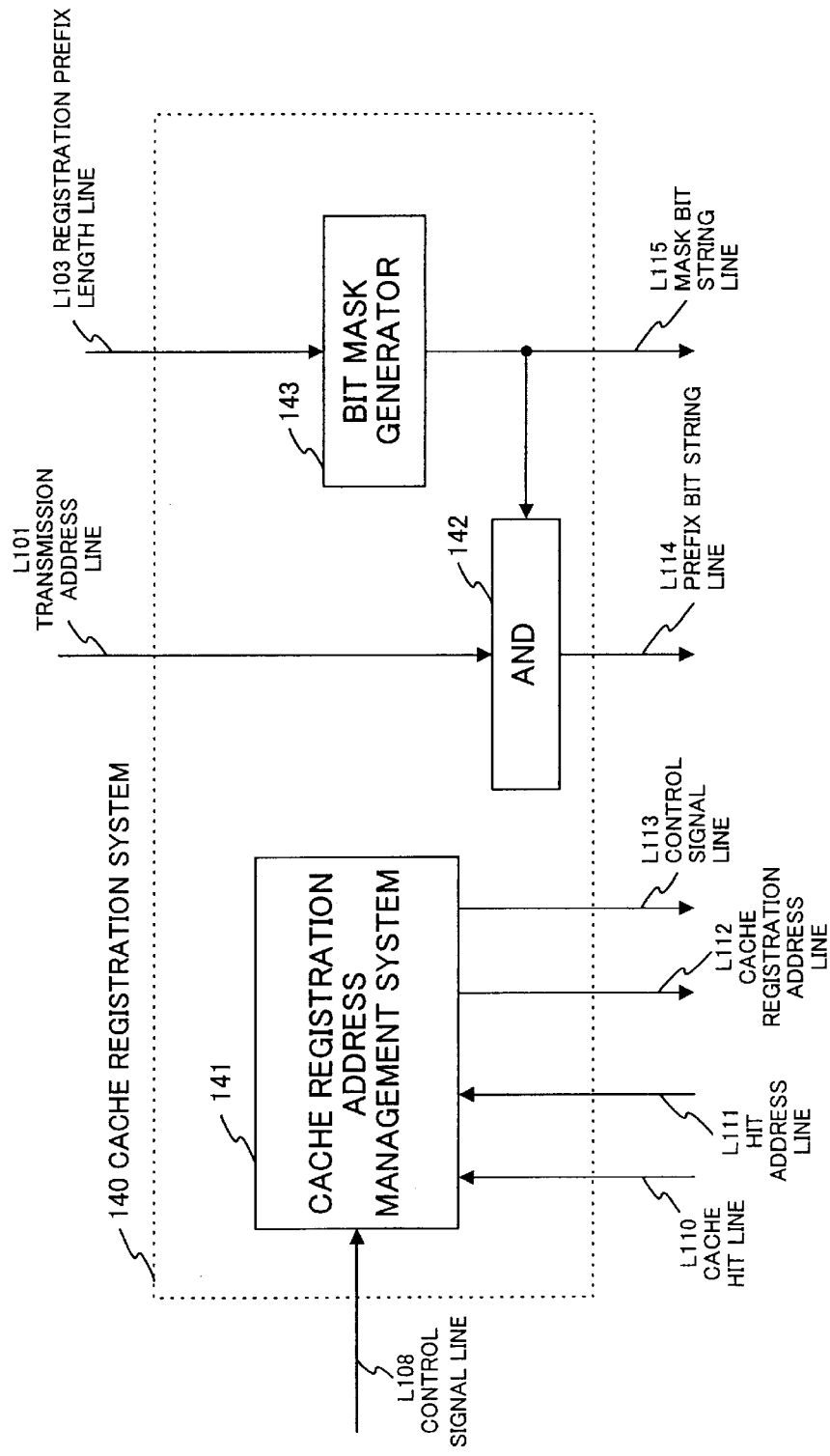
FIG. 5 is a detailed configuration diagram of a cache registration system 140 in the first embodiment.

FIG. 5 is a detailed diagram of the cache registration system 140. A bit mask generator 143 generates a mask bit string having the same width as a bit width of the network address based on a value inputted from the registration prefix length line L103. More specifically, a bit string is generated in which 1 continuously stands from the uppermost bit to lower-order bits by a length of the value of the registration prefix length line L103 and remaining bits are 0. For example, in the case where the bit width of the network address is 32, when the registration prefix length value of L103 is 6, only 6 bits from the uppermost bit are set to 1 and the remaining bits are set to 0. That is, a bit string of 11111100 00000000 00000000 00000000 (a space is given every 8 bits) is generated and outputted to the mask bit string line L115.

An AND circuit 142 generates a bit string by logical operation AND of a bit string inputted from the destination address line L101 (having the same bit width as a bit width of the network address) and a bit string generated in the bit mask generator 143 for every bit. For example, in the case where the network address is 32 bits wide, when 11001111 11111100 11111111 00000000 (a space is given every 8 bits) is inputted from the destination address line L101 and 11111100 00000000 00000000 00000000 (a space is given every 8 bits) is inputted from the mask bit string line L115, a bit string of 11001100 00000000 00000000 00000000 (a space is given every 8 bits) is generated and outputted to the prefix bit string line L114.

When the control signal line L108 is made active, a cache registration address management system 141 makes active the control signal line L113 and outputs a cache-storing address in the mask-cache table to the cache registration address line L112. This address is determined as follows. First, the cache address area is divided into a resident entry area and a update entry are. The resident entry are always stores and never deletes an resident entry. In the update entry are, a cache is updated using an algorithm like LRU. The cache registration address management system 141 may memorize an unused address in which no entry is registered among cache addresses other than the resident entry are in the cache, for example, in list form. That unused address is used as a registration address of the cache. When there is no unused address, the cache registration address management system may memorize an in-use address already registered into the cache in list form. The cache registration address management system 141 can be informed when and which address is found depending on a value of the hit address line L111 when the cache hit line L110 is set to the hit value. Thus, it may find out the address of an entry recently not hit in an appropriate manner and determine an address in which a cache should be registered. Of course, it is possible to eliminate the are for the resident entry and manage all address area as an update entry area.

Figure 6:
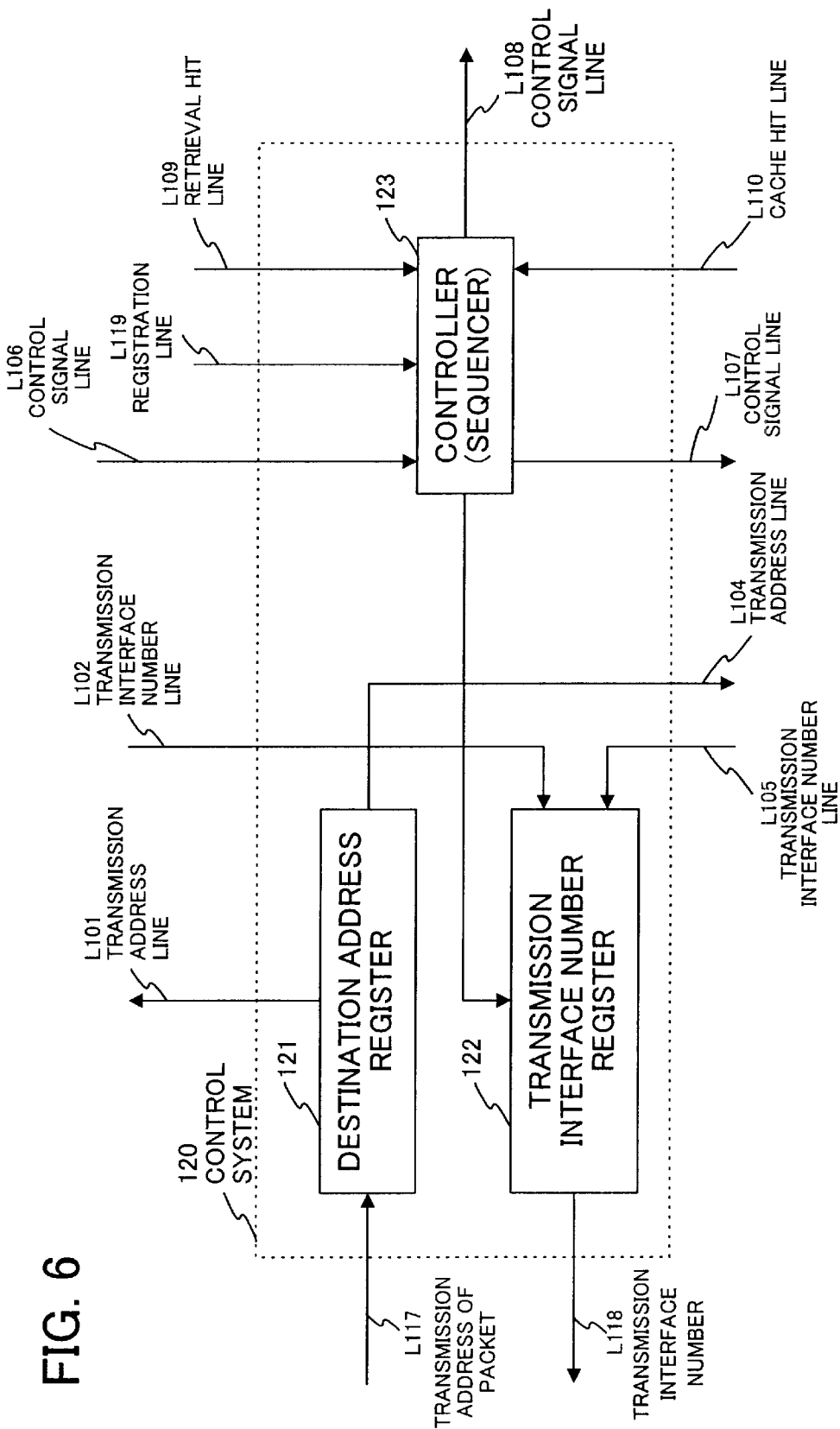
FIG. 6 is a detailed configuration diagram of a control system 120 in the first embodiment.

FIG. 6 is a detailed diagram of the control system 120. When a packet arrives, the destination address of the received packet is inputted through the line L117 and then the following operation starts. A destination address register 121 stores the destination address of a packet inputted to the control system 120 and outputs its value to the destination address line L101 and the destination address line L104. A controller 123 includes a sequencer and operates as follows.

When receiving the destination address of an input packet, the control system 120 starts operation and first, mates the control signal line L107 active. Next, when the cache hit line L110 is set to the hit value, a value of the transmission interface number line L105 is fetched from the mast-cache table retrieval system 130 and is stored into a transmission interface number register 122. The transmission interface number is outputted to the line L118. When the cache hit line L110 is set to the non-hit value, the control signal line L106 is made active. Then, unless the retrieval hit line L109 is set to the hit value, error processing is carried out. When the retrieval hit line L109 is set to the hit value, a value of the transmission interface number line L102 is fetched and stored into the transmission interface number register 122 and then the transmission interface number is outputted to the line L118. When the line L109 is set to the hit value and the registration line L119 is made active, the control signal line L108 is made active. Then, all the control signal lines L107, L106, L108 are made inactive and stopped. A value outputted to the line L118 is a result of path determining processing according to this embodiment.

Next, an operation of the first embodiment will be described with reference to a flow chart of FIG. 8.

Figure 8:
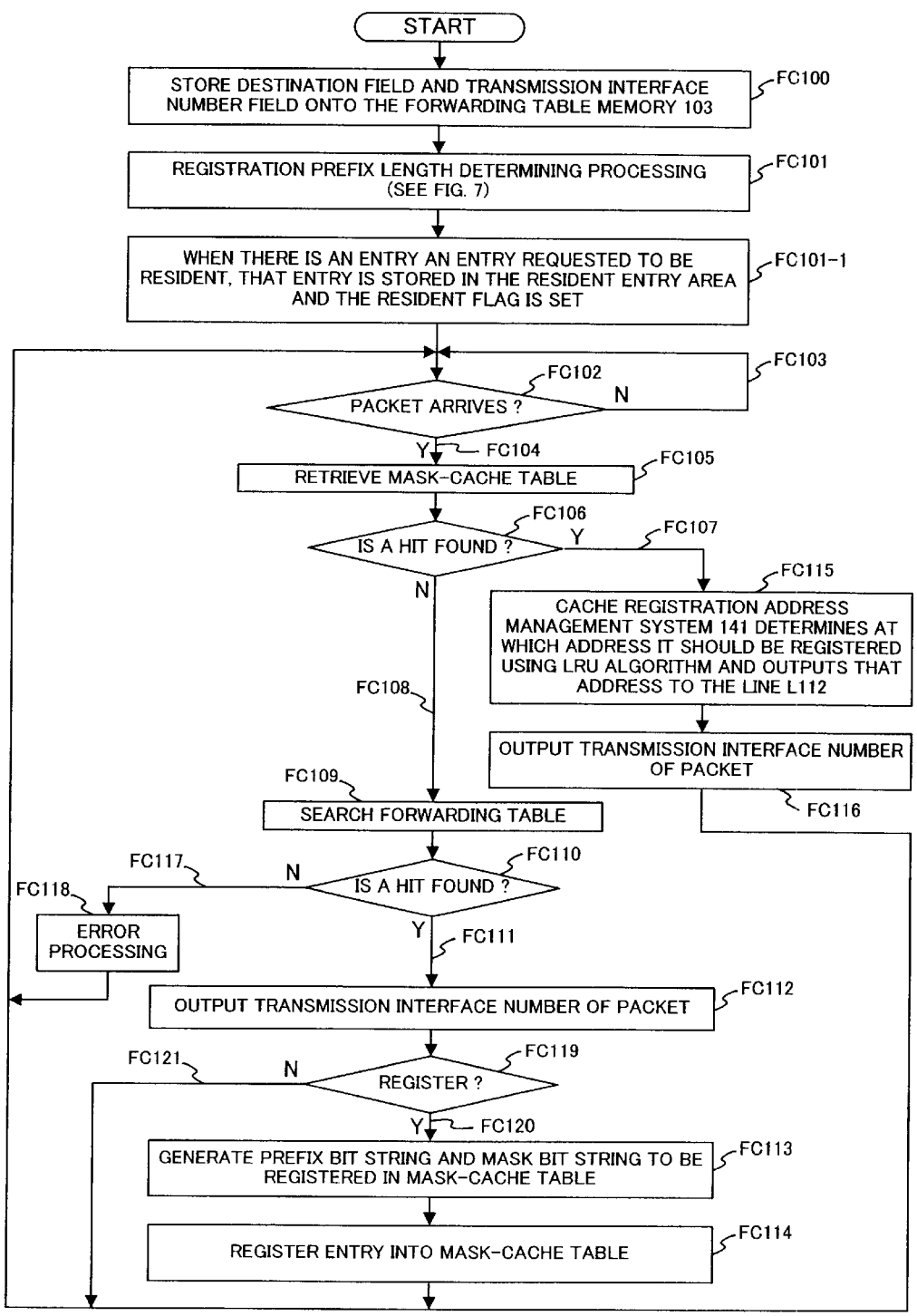
FIG. 8 is a flow chart for explaining an operation of the first embodiment.

Referring to FIG. 8, first, the destination field and the transmission interface number field are written onto the forwarding table memory 103 as in the case of the forwarding table of the conventional router (step FC100). At this time, as described in a description of the structure of the forwarding table retrieval system 100, registration prefix length determining processing is carried out and the registration prefix length field of each entry is determined (FC101). When there is an entry requested to be resident in the forwarding table, that entry is stored in the resident entry area of the cache and the resident flag in the corresponding forwarding table is set to 1 (FC101-1).

When a packet arrives at the router (FC104), the destination address of the received packet is inputted to the control system 120 via the line L117. This destination address is stored in the destination address register 121 in the control system 120 and is outputted to the destination address lines L101, L104. Next, the controller 123 in the control system 120 makes the control signal line 107 active. The mask-cache table retrieval system 130 retrieves the mask-cache table using a value of the destination address line L104 (FC105).

When a hit is found in the mask-cache table (FC107), the cache hit line L110 is set to the hit value and the address of the hit entry in the mask-cache table is outputted to the hit address line L111. Further, the transmission interface number of the hit entry is outputted to the transmission interface number line L105. At this time, the cache registration address management system 141 receives a value on the hit address line L111 after the cache hit line L111 is set to the hit value. And, the cache registration address management system 141 determines which address it should be registered using LRU algorithm or the like and outputs that address to the cache registration address line L112 (FC115). After the cache hit line L110 is set to the hit value, the control system 120 stores a value of the transmission interface number line L105 into the transmission interface number register 122 and outputs the transmission interface number L118 (FC116).

When no hit is found in FC106 of the same flow chart (when the cache hit line L110 is set to the non-hit value and the processing proceeds to FC108), the controller 123 in the control system 120 makes the control signal line L106 active. After the control signal line L106 is made active, the forwarding table retrieval system 100 fetches a value of a destination address of a packet outputted to the destination address line L101 and the table retrieval system 101 searches the forwarding table (FC109). When an entry is found as a result of the retrieval (FC111), the retrieval hit line L109 is set to the hit value. Then, the transmission interface number and registration prefix length of the found entry are outputted to the transmission interface number line L102 and registration prefix length line L103, respectively. If the resident flag of the found entry is 0, then the registration line L119 is also made active.

After the retrieval hit line L109 is made active, the control system 120 fetches a transmission interface number through the transmission interface number line L102 and outputs it to the line L118 (FC112). Further, when the registration line L119 is made active (FC120), the control signal line L108 is also made active.

The cache registration system 140 generates a prefix bit string and a mask bit string to be registered in the destination field of the mask cache based on values of a bit string indicated by the destination address line L101 and the registration prefix length line L103 (FC113) and outputs them to the prefix bit string line L114 and mask bit string line L115. After the control signal line L108 is made valid, the cache registration address management system 141 makes active the control signal line L113.

When the control signal line L113 is made active, the mask-cache table retrieval system 130 fetches values of the prefix bit string line L114, mask bit string line L115, transmission interface number line L102, and cache registration address line L112 and stores values of the prefix bit string line L114, mask bit string line L115 and transmission interface number line L102 at addresses in the mask-cache table indicated by the cache registration address line L112 (FC114). When no hit is found in FC110 of the flow chart (FC117), error processing is carried out in the control system 120 (FC118). When the registration line L119 is not made active in FC119 (FC121), the control system 120 does not make the control signal line L108 active and processing on the FC113, FC114 is not carried out.

There is a restriction in an entry which can be resident in the mask-cache table of the forwarding table in a description of the operation. This matter will be described in a final section of this embodiment.

The forwarding table is retrieved and when an entry is found (FC111), the registration line L119 is made active Alternatively, it is also permissible to prepare a flag for identifying whether an entry should be registered and make active the registration line L119 corresponding thereto.

Hereinafter, an example of the operation of the first embodiment will be described. Here, assume that the network address is 32 bits. Further, assume that nothing is registered in an update entry area of the mask-cache table in the initial state. Further, assume that the forwarding table of the router is as shown in FIG. 28 and that an entry of the address 4 is selected as the resident entry. Then, assume that the number of entries in the cache is 4 (address 1 to 4) and that the address 4 of the cache is determined as an address for the resident entry.

First, the registration prefix length determining system 102 carries out registration prefix length determining processing so as to determine a registration prefix length of each entry in the forwarding table.

As to the registration prefix length of an entry at address 1, E=1 and PL=8 is set up in the registration prefix length decision processing described about the structure of the registration prefix length determining system 102 and, for entries at addresses 2 to 6, the registration prefix length determining steps z1 to z4 are executed successively. When an entry of address 2 is processed, the PL is updated to 16. When an entry of the address 3 is processed, the PL is updated to 24. After that, the PL is not updated for any entry of address 4 to 6 and the registration prefix length is determined to be 24.

For the registration prefix length of an entry of address 2, E=2 and PL=16 is set in the registration prefix length determining processing and then, the registration prefix length determining steps Z1 to Z4 are carried out successively for entries of address 1, 3 to 6. For address 1, the registration prefix length determining steps Z1 to Z3 are not affirmative and at Z4, PL remains 16. For the address 3, the registration prefix length determining steps Z1 to Z3 are affirmative, so that at Z4, the PL is 24. For the addresses 4 to 6, nothing is changed at Z4. Finally at address 2, the registration prefix length is determined to be 24.

The same registration prefix length determining processing is carried out for address 3 to 6 and consequently, the forwarding table is as shown in FIG. 29. The mask-cache table is as shown in FIG. 30.

Next, assume that packets having destination addresses 10.5.1.1, 10.2.3.5, 1.1.1.1, 10.2.3.4, and 20.1.2.3 sequentially arrive in this order.

When a packet whose destination address is 10.5.1.1 arrives, the mask-cache table is searched using the address 10.5.1.1 as a key by the mask-cache table retrieval system 130. Because there is no matching entry in the mask-cache table, no entry is hit and next, the forwarding table is searched using the address 10.5.1.1 as a key. As a result, the address 1 is hit so that the value "1" is outputted to the transmission interface number line L102 and the value "24" is outputted to the registration prefix length line L103. The control system 120 determines the transmission interface number to be 1 and outputs it to the line L118. At the same time, in the cache registration system 140, a bit string 255.255.255.0 in which 1 stands in each of 24 bits from the uppermost bit indicated by the registration prefix length line L103 in the mask bit string L115 and 0 stands in the remainder is generated by the bit mask generating circuit 143. Further, 10.5.1.0 obtained by logical operation AND of the value 10.5.1.1 of the destination address line L101 and the value of the mask bit string line L115 is outputted to the prefix bit string line L114. Assuming that the cache registration address management system 141 registers entries successively from the head address of unused entries into the mask cache it comes that a mask-cache entry is registered at address 1 of the mask-cache table. As a result, the mask-cache table becomes as shown in FIG. 31.

Next, when a packet whose destination address is 10.2.3.5 arrives, no hit is found in the mask-cache table, however, the address 3 of the forwarding table is hit. Therefore, the transmission interface number is determined to be 3. Since the registration prefix length field of address 3 is z4, the cache registration system 140 determines that a prefix bit string to be registered in the mask-cache table is 10.2.3.0 and the mask bit string is 255.255.255.0. As a result, the mask-cache table becomes as shown in FIG. 32.

Next, when a packet whose destination address is 1.1.1.1 arrives, no hit is found in the mask-cache table, however, the address 5 of the forwarding table is hit, so that the transmission interface number is determined to be 5. The mask-cache table becomes as shown in FIG. 33.

When a packet whose destination address is 10.2.3.4 arrives, the address 2 of the mask-cache table is hit, so that the transmission interface number is determined to be 3. The mask-cache table is not changed.

When a packet whose destination address is 20.1.2.3 arrives, the address 4 of the masked cache is hit, so that the transmission interface number is determined to be 4. The mask-cache table is not changed.

In the above manner, according to the first embodiment, the packet transmission interface number is determined and the packet is sent according to the determined packet transmission interface number.

Here, it will be described that, according to the first embodiment, even when a hit is found in the mask-cache table, a proper transmission interface number can be determined.

According to the first embodiment, a registration prefix length of an entry hit upon retrieval of the forwarding table based on the destination address of the packet is obtained. Of a bit string indicating the destination address of the packet, a partial bit string starting from the uppermost bit thereof corresponding to the registration prefix length is registered in the mask-cache table. In this registration method, for a proper transmission interface number to be determined even when an entry hits in the cache, it has only to be indicated that the entry registered in the cache never includes any of other entries existing in the forward table, which is included in the entry existing in the forwarding table, which is included in the entry hit by the forwarding table retrieval.

Actually, the registration prefix length field of the forwarding table stores a maximum cache prefix length, or a maximum prefix length among other entries included in the address set of the entry in forwarding table. In the steps Z1 and Z2 of the registration prefix length determining processing, it is checked whether the entry CE is included in the entry E (when both steps Z1 and Z2 are affirmative, the entry CE is included in the entry E). By determining that the prefix length of the CE is longer than the PL in Z3, the maximum prefix length is selected. Therefore, the inclusion condition 1 of the address set described in definition of the maximum cache prefix length is never satisfied. Therefore, when there are some other entries included in an entry hit upon forwarding table retrieval, the registered entry never includes any one thereof.

An entry which can be resident in the mask-cache table of the forwarding table has a restriction. That restriction is that, as described in the above explanation that a proper transmission interface number can be determined by the cache registration method of the first embodiment, when there is another entry included in an entry hit in the forwarding table retrieval, the registered entry never include any one thereof.

For example, in the forwarding table shown in FIG. 34 addresses 3, 4, 6 satisfy this restriction and those entries can be resident. However, entries of addresses 1, 2, 5 cannot be resident.

SECOND EMBODIMENT

Figure 9:
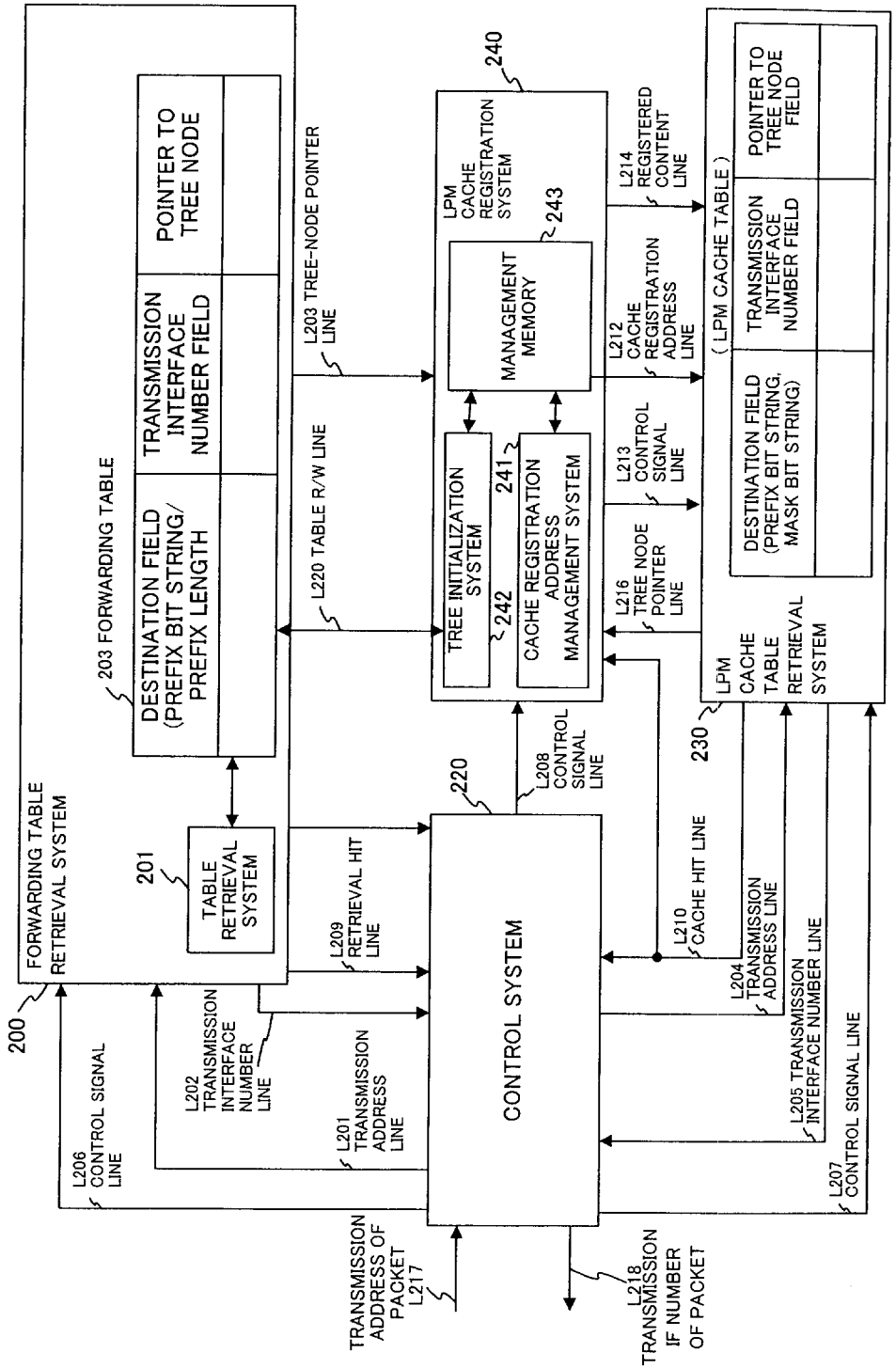
FIG. 9 is a configuration diagram of a route determining device for use in a router with a cache according to a second embodiment of the present invention.

FIG. 9 is a diagram of a route determining system according to a second embodiment of the present invention. The route determining system includes a forwarding table retrieval system 200, a control system 220, an LPM cache table retrieval system 230, and an LPM cache registration system 240. The details of each component system as shown in FIG. 9 will be described.

Forwarding Table Retrieval System 200

The forwarding table retrieval system 200 includes a forwarding table memory 203 storing a forwarding table for routing and its retrieval system 201. The forwarding table has a destination field and a transmission interface number field and further has a pointer field which is used to store a pointer to a tree management list node holding a tree structure list generated corresponding to the forwarding table. When the control signal line L206 is made active, the destination field of the forwarding table is retrieved based on the destination address of a packet inputted via the packet destination address line L201. A transmission interface number obtained as a result of the retrieval and a pointer to the tree node are outputted to a transmission interface number line L202 and a tree-node pointer line L203. Further, the forwarding table is also read and written by a tree initialization system 242 which will be described later.

Control System 220

With a destination address L217 of the packet received by the router as input, the control system 220 controls the forwarding table retrieval system 200, LPM cache registration system 240 and LPM cache table retrieval system 230 so as to determine a transmission interface number of the packet to be forwarded and output it to the line L218.

TPM Cache Table Retrieval System 230

The LPM cache table retrieval system includes an LPM cache table and a function of retrieving it. The LPM cache table has a destination field, a transmission interface number field and a tree-node pointer field. The destination field accommodates a pair of a prefix bit string indicating a network address and a mask bit string. The LPM cache table retrieval system 230 has a function of searching the LPM cache table. This is comprised of, for example, a memory with LPM retrieval function which is disclosed in Japanese Patent Application No. 9-234250 (filed on Aug. 29, 1997 by the present Applicant, Japanese Patent Application Laid-open No. 11-073782) and a RAM (random access memory). Upon retrieval, when a destination address of a packet is given by the line L204, the LPM retrieval of the destination address of each entry is performed. When a matching entry is found, the cache hit line L210 is set to a hit value. A transmission interface number of that entry and a value of the tree-node pointer field are outputted to the lines L205 and L215 respectively. When no hit is found, the cache hit line L210 is set to a non-hit value.

LPM Cache Registration System 240

The LPM cache registration system 240 registers an entry into the LPM cache table and includes a cache registration address management system 241, tree initialization system 242 and management memory 243. The cache registration address management system 241 manages the address area of the cache which is divided into a resident entry area which always registers and never delete an entry and a update entry area for updating an entry using algorithm such as LRU. In the update entry area, the address of an in-use/unused entry in the LPM cache table is managed. For effective use of the cache, of in-use entries, an entry hit in the cache is managed by for example, LRU. Further, the forwarding table is managed according to a tree-type list structure. Upon registration/deletion of the LPM cache, which entry should be registered or deleted in the forwarding table is determined. The tree initialization system 242 initializes this tree type list. Of course, it is permissible that no resident entry is produced.

Next, the respective components will be described in detail.

Figure 10:
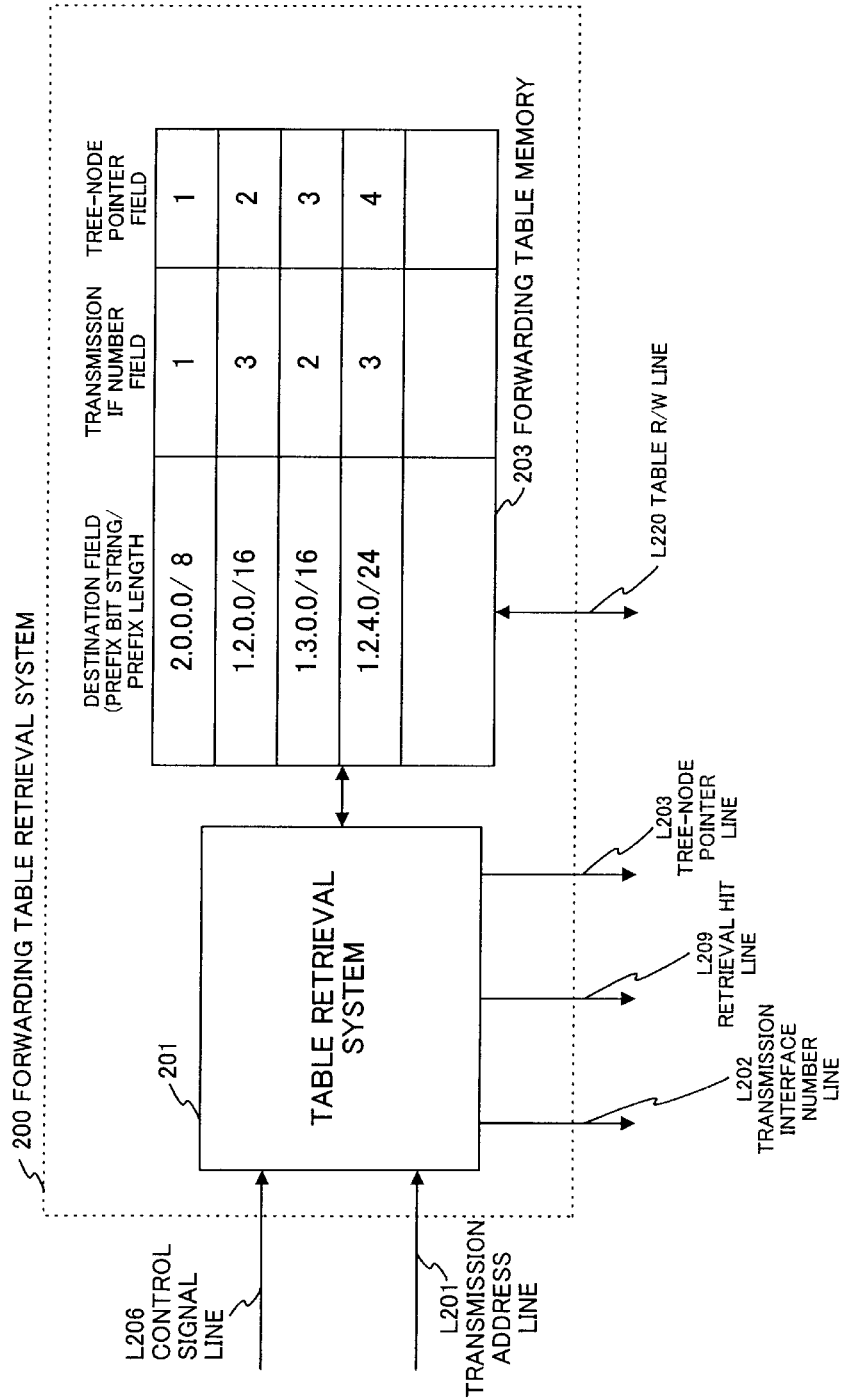
FIG. 10 is a detailed configuration diagram of a forwarding table retrieval system 200 in the second embodiment.

FIG. 10 shows the forwarding table retrieval system 200 in detail which includes a forwarding table memory 203 for storing the forwarding table for routing and a table retrieval system 201 for retrieving. The forwarding table has a destination field and a destination interface field and further has a tree-node pointer field. The destination field includes a prefix bit string indicating prefix and a prefix length field indicating a prefix length of prefix bit string. When the control signal line L206 is made active, the table retrieval system 201 performs LPM-retrieval for searching the destination field of the forwarding table stored in the forwarding table memory 203 based on a destination address of a packet inputted via the destination address line L201. When a hit is found by the retrieval, the retrieval hit line L209 is set to a hit value and a transmission interface number of the entry hit by the retrieval is outputted to the transmission interface number line L202. Then, the pointer to the tree node is outputted to the tree-node pointer line L203. When no hit is found by the retrieval, the retrieval hit line L209 is set to a non-hit value. In the table retrieval system 201, a system for retrieving the destination field by LPM retrieval can be achieved based on the destination address of the packet by using the same LPM retrieval system as the conventional router.

Figure 11:
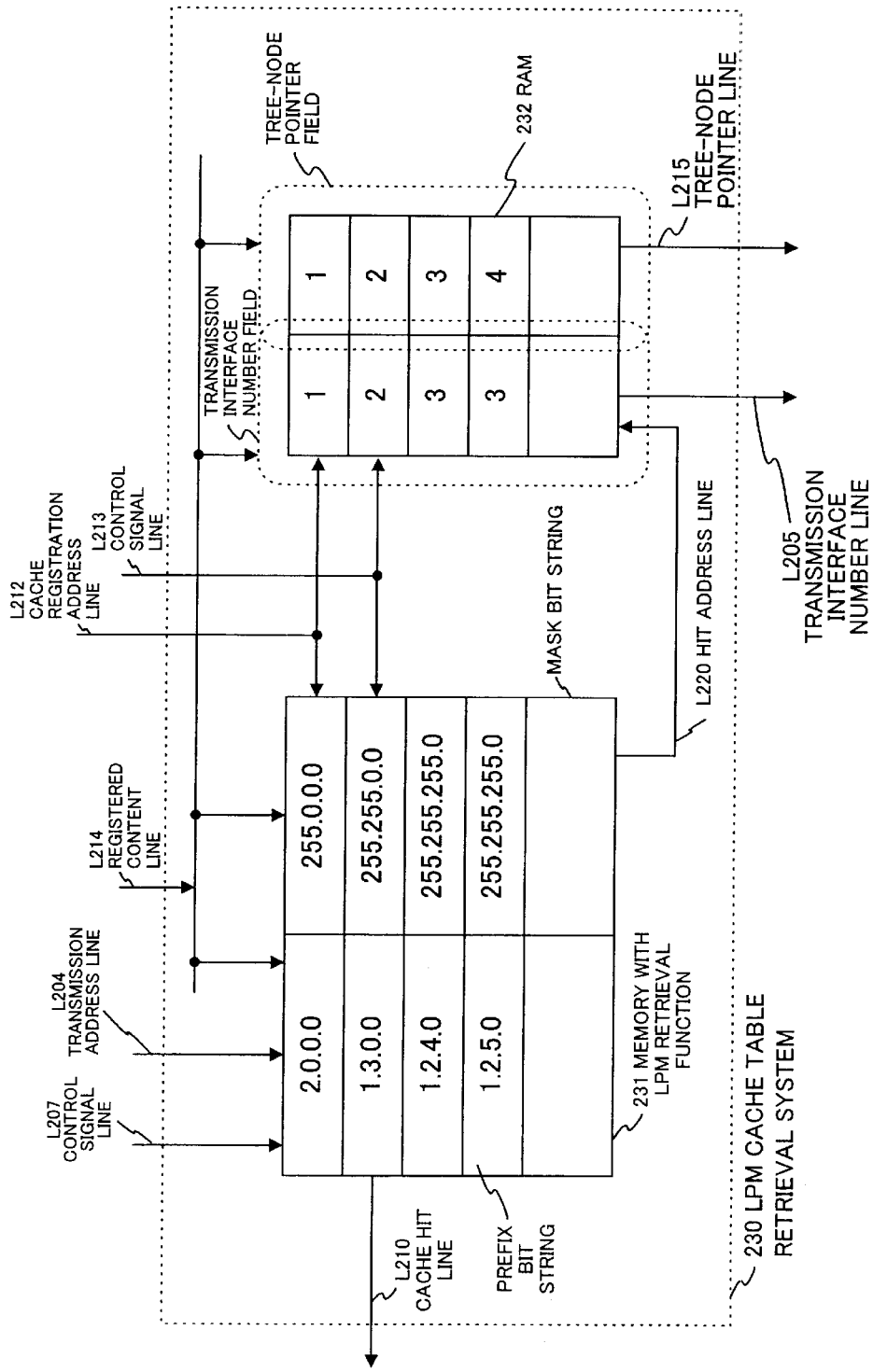
FIG. 11 is a detailed configuration diagram of a LPM cache table retrieval system 230 in the second embodiment.

FIG. 11 shows the LPM cache table retrieval system 230 in detail which includes a memory with LPM retrieval function (hereinafter, called an LPM-retrieval memory 231) and a RAM (random access memory) 232. When a pair of a prefix bit string indicating a prefix and a mask bit string indicating a prefix length are registered in the LPM-retrieval memory 231 for each address, when a bit string of a retrieval key is given, the LPM retrieval is carried out so as to output an address of a matching entry. In the mask bit string, 1 stands for each bit for the length of the prefix length from the uppermost bit toward lower-order bits and 0 stands for the remainder bits.

For example, assume that four entries shown in FIG. 35 are registered in the 8-bit-wide LPM-retrieval memory 231. Each of these entries expresses following prefix:
address 1: 101xxxxx (prefix length is 3);
address 2: 1101xxxx (prefix length is 4);
address 3: 1100xxxx (prefix length is 4); and
address 4: 11011xxx (prefix length is 5),
where x indicates 'don't care' (0 or 1 is permissible).

When 11011111 is given as a retrieval key, the prefixes of the entries of address 2 and address 4 match with each other. The address 4 having the longest prefix of them is outputted as a LPM retrieval result to the line L220. For address 1, when the data bit string is masked with a mask bit string, that bit string is 10100000. When the retrieval key is masked with the mask bit string, that bit string is 11000000. That is, these two bit strings do not match with each other. Likewise, for address 3, when 11000000 and 11010000 are compared, they do not match with each other. For address 2, 11010000 and 11010000 are compared and consequently, they match with each other. For address 4, 11011000 and 11011000 are compared and consequently, they match with each other. However, because the prefix of address 4 is longer, the address 4 is outputted as a result of retrieval.

The LPM cache table has a destination field, a transmission interface number field and a tree-node pointer field. The destination field includes a pair of a prefix bit string indicating a network address and a mask bit string. The prefix bit string is stored as data bit string in the LPM-retrieval memory 231 and the mask bit string is stored as mask bit string in the LPM-retrieval memory 231. The transmission interface number field and tree-node pointer field are stored into the RAM 232 at the same address as when the destination field (prefix bit string and mask bit string) is stored in the LPM-retrieval memory 231. In FIG. 11, it is assumed that the network address has 32-bit width and the prefix bit string and mask bit string are expressed in decimal number with dots. For example, a mask bit string of 2.1.0.0 expresses a bit string of 00000010 00000001 00000000 00000000 (a space is entered every 8 bits). A mask bit string of 255.255.0.0 expresses a bit string of 11111111 11111111 00000000 00000000 (a space is entered every 8 bits).

When the control signal line L213 is set to a value indicating Write, an entry is registered in the LPM cache table. This is carried out in a following procedure. In the LPM-retrieval memory 231, a prefix bit string and mask bit string inputted via a registration content line L214 are stored at an address indicated by the cache registration address line L212. At the same time, the transmission interface number and the pointer to the tree node inputted from the registration content line L214 are stored into the RAM 232 at an address (the same address as that of the LPM-retrieval memory 231) indicated by the cache registration address line L212. Upon deletion of an entry, the control signal line L213 is set to a value indicating deletion and a cache entry stored at the address indicated by the current value of the cache registration address line L212 is deleted.

When the control signal line L207 is made active, retrieval is carried out. A bit string indicating a destination address is inputted to the LPM-retrieval memory 231 from the destination address line L204 as a retrieval key. The LPM retrieval is carried out by the function of the LPM-retrieval memory 231. When there is a matching entry, the cache hit line L210 is set to a set value and an address of the LPM-retrieval memory 231 in which an entry hit by the hit address line L220 is registered is outputted. At the same time, the cache hit line L210 is set to the hit value. Then, a transmission interface number and a pointer to the tree node, written at an address of the hit address line L220, are read out from the RAM 232. Those values are outputted to the transmission interface number line L205 and the tree-node pointer line L215, respectively. When no hit is found, the cache hit line L210 is set to a non-hit value.

Figure 12:
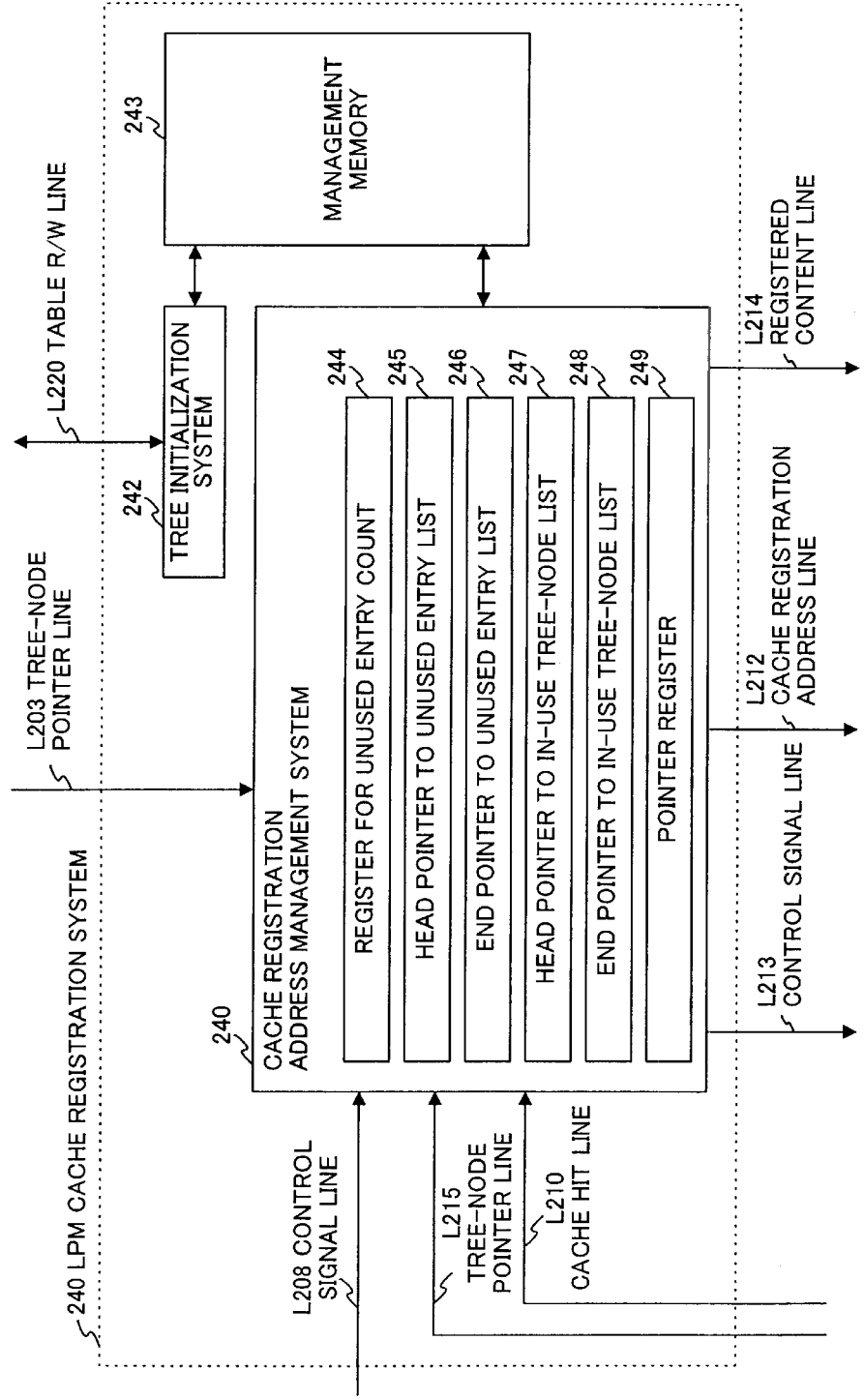
FIG. 12 is a detailed configuration diagram of a LPM cache registration system 240 in the second embodiment.
Figure 13:
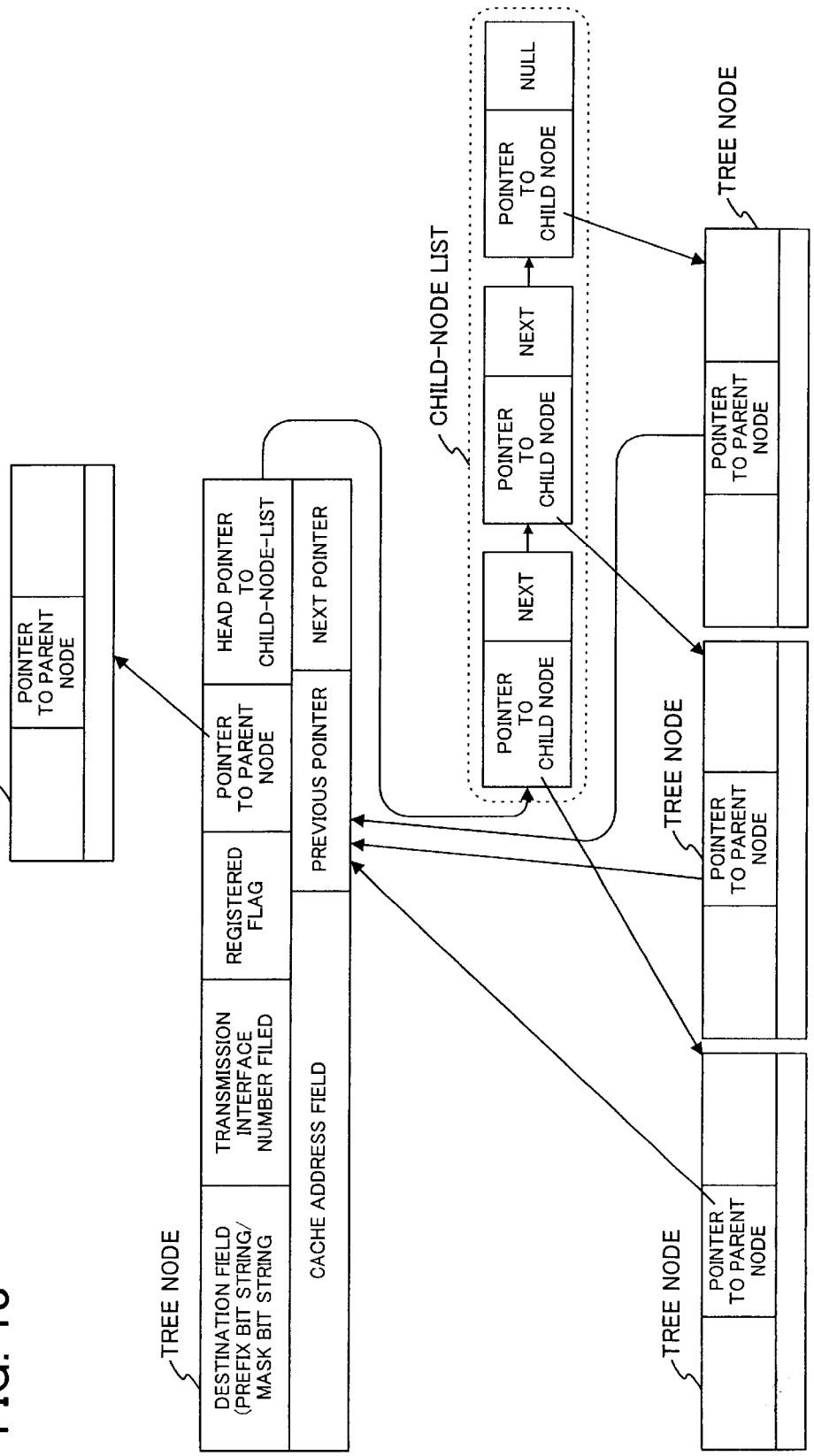
FIG. 13 is a diagram showing a tree node managed by the LPM cache registration system 240 in the second embodiment.

FIG. 12 is a detailed diagram of the LPM cache registration system 240. The LPM cache registration system 240 manages nodes corresponding respectively to entries of the forwarding table with a tree-type list. Tree nodes are placed in the management memory 243 and the tree initialization system 242 initializes the tree structure. Each node of the tree, as shown in FIG. 13, has a destination field consisting of a pair of prefix bit string and mask bit string, a transmission interface number field, a 2-bit registered flag field, a field of pointer to parent node, and a field of head pointer to child node list. Further, it has a cache address field for indicating an address in the cache when a given entry is registered in the cache, a previous pointer field, and a next pointer field for use in LRU management of address in the case of cache registration. The head pointer to the child list indicates a child node list in which a pointer of the given node to a child node is managed in list form.

First, the relation between a parent node and a child node will be described.

A set of network addresses indicated by the destination address of a node will be considered. All nodes associated with the forwarding table have each address sets. It is assumed that the entirety of these sets is U. A parent node of a node A is defined as a node having the fewest members among sets including network addresses indicated by the destination address of the node A in U. That is, that node has a destination having the longest prefix length.

Parent Node Retrieval Procedure

Assume that a node which wants to find out its parent node is N1. Then, assume that the parent node is PN (Null is entered for its initial value) and a prefix length of the parent node is L (L=−1 as initial value). Pay attention to all nodes except for N1 in succession and performs the following decision steps X1, X2 and X3.

X1: determine whether the prefix length of a node of interest is shorter than the prefix length of N1 (except that they are equal).

X2: determine whether the prefix bit string of N1 and prefix bit string of a node of interest match with each other by comparing them in bits of the prefix length from the uppermost bit toward lower bits.

X3: replace PN with a node of interest if X1 and X2 are affirmative and the prefix length of the node of interest is larger than L (except when equal).

When the final entry in reached, the parent node of E is set in the PN. If PN=Null, there is no parent node in that entry and then, a pointer to the parent node is set to Null value (invalid value).

Returning to initialization of the tree structure, the tree initialization system 242 carries out the following tree initialization procedure.

Tree Initialization Procedure

Step 1): The same number of nodes as that of entries in the forwarding table are prepared on the management memory 243 and the tree-node pointer field in the forwarding table is prepared so that a pointer points to each node prepared. Then, the same destination field and transmission interface number field as in the forwarding table are written onto the destination field and transmission interface number field of a node, respectively. In the mask bit string of the destination field, 1 is posted at each of the same number bits as the prefix length in a bit string having the same bit width as the network address from the uppermost bit toward lower bits and the remainder is 0. The 2-bit registered flag is "00" and the cache address, previous pointer and next pointer are set to NULL (invalid value). When there is a resident entry which is required to be always registered as a cache entry among the entries of the forwarding table, the registered flag is set to "10" and that entry is registered in the cache address area for resident entry.

Step 2): Attention is sequentially paid to each node produced in the previous step 1) and the parent node retrieval procedure is carried out to find a parent node of a node of interest. When a parent node is found, the address of the found parent node is registered into the parent node pointer. Further, a node to which attention is paid as a child node of that parent node is registered. This is attained by adding a list storing the address of an entry to which attention is paid to the child-node list.

Step 3): End

As shown in FIG. 12, the cache registration address management system 241 includes an unused entry count register 244, a head pointer 245 to unused entry list, an end pointer 246 to the unused entry list, a head pointer 247 to in-use tree node list, and an end pointer 248 to in-use tree node list. The cache address area is divided into a resident entry area as in the tree initialization procedure 1) for an entry which is always registered and never deleted and an update entry area for an entry which is updated using an algorithm such as LRU.

Figure 14:
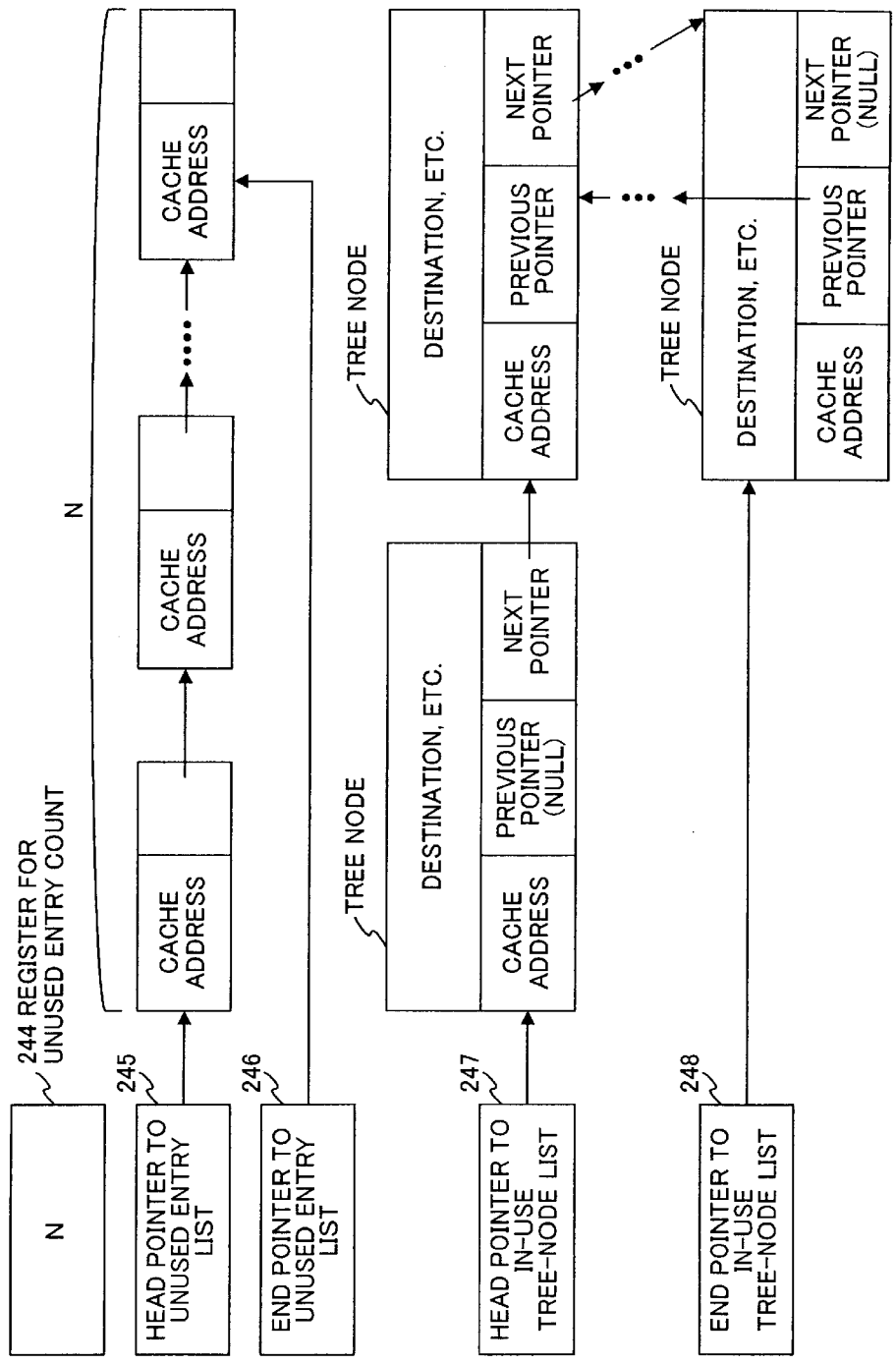
FIG. 14 is a diagram showing unused entry list and in-use tree list managed by the LPM cache registration system 240 in the second embodiment.

As shown in FIG. 14, in the update entry cache address area, the cache registration address management system 241 manages the unused addresses in the cache in form of the unused entry list in which each node of the list has an address for unused cache entry and a pointer to the next node in a part of an address used as an update entry. The head pointer 245 of the unused entry list indicates a head node of the list and the end pointer 246 of the unused entry list indicates an end node of the end pointer 246. Of the tree nodes produced by the tree initialization system 242, a tree node whose destination and transmission interface number are registered in the LPM cache table is connected via two-way list. The head pointer 247 and end pointer 248 to the in-use tree node list memorize its head node and end node (see FIG. 14).

The register, pointer and list are initialized as follows. The unused entry list initializes all addresses of the cache with connecting them through the list and the head address of the list is registered at the head pointer 245 of the unused entry list. Further, the number of nodes included in the unused entry list is set up in the unused entry count register 244. The head pointer 247 and end pointer 248 of the in-use tree node list are initialized by Null (invalid value).

Next, the entry registration procedure and entry deletion procedure to be executed by the cache registration address management system 241 will be described.

Entry Registration Procedure

Step 1. An arbitrary number (for example, M) of pointers (tree addresses) to tree nodes are inputted to the cache registration address management system 241.

Step 2. M lists are removed from the unused entry list. The unused entry count register 244 updates such that M is subtracted from the stored value thereof.

Step 3. M tree nodes are read out and attached to the head of the in-use tree node (regardless of an order in the M tree nodes). At this time, the M tree nodes are connected by the previous pointer and next pointer as two-way list. The head pointer 247 and end pointer 248 to the in-use tree node list are set properly.

Step 4. At the same time, the destination and transmission interface number of the tree node are read out and then M pairs (destination, transmission interface number, pointer to tree node) are stored at M cache addresses which have read out from the list removed in the step (2). Upon storage, the control signal line L213 is set to a value indicating M times that write operation repeats. The cache address is outputted to the line L212 and M sets of the destination, transmission interface number and pointer to the tree node are outputted and stored at specified M addresses by the LPM cache table retrieval system 230.

Step 5. As for M tree nodes, cache address storing (destination, transmission interface number, pointer to the tree node) of that node is stored in the cache address field. Further, the 2-bit registered flag is also set to "01".

Step 6. End.

Entry Deletion Procedure

Step 1. A tree node indicated by the end pointer 240 to the in-use tree node list is read out.

Step 2. Tracing tree node parents in succession and about a node in which the registered flag thereof is set to "01" (not a resident entry but a registered node).
Step 2-1. the registered flag is set to "00" and
Step 2-2. The address (pointer) of the tree node and cache address are obtained.

Step 3. As for all obtained tree nodes in the step (2-2), the node is removed from the in-use tree node list. Then, by using a value of the cache address field written in the nodes, a node of the unused entry list is produced with the cache address field and next pointer in pair and is added to any place (for example, head) of the unused entry list. Further, a node number, which is attached to the unused entry list, is added to the unused entry count register 244 so as to update the unused entry count.

Step 4. The caches of all cache addresses obtained in the step (2-2) are deleted. A deletion indication and an address to be deleted are outputted to the LPM cache table retrieval system 230 using the control signal line L213 and cache address line L212.

Step 5. End.

The LRU management procedure to be executed by the cache registration address management system 241 will be described. When the cache hit line is set to a hit value, the following LRU management procedure is carried out.

LRU Management Procedure

Step 1. A value of the tree-node pointer line L215 is read and an address of a tree node corresponding to a cache entry hit by the retrieval is obtained.

Step 2. The cache registration address management system 241 arranges the two-way list of the in-use tree node list so that a tree node indicated by a given pointer comes to the head of the in-use tree node list.

Step 3. End.

The cache registration address management system 241 also carries out the cache registration procedure which will be described below. When the control signal line L208 is made active, a pointer is read from the tree-node pointer line L203 and is stored in the pointer register 249. Then, the cache registration procedure as shown below is carried out.

Cache Registration Procedure

Step 1. From the tree node indicated by the pointer register 249, all nodes below the tree (in the direction to the child node) existing on the management memory 243 are checked using an ordinary tree search algorithm (for example, breadth-first search) so as to obtain an address of the node in which no registration flag is posted. Further, the number of these nodes is counted and the count is regarded as N.

Step 2. A value of the unused entry count register 244 in the cache registration address management system 241 is compared with N and if it is equal to or smaller than N, then the processing proceeds to the step (4).

Step 3. The cache registration address management system 241 carries out the above-described entry deletion steps (1) to (5) and the processing proceeds to the step (1).

Step 4. By inputting addresses of N nodes obtained in the step (1), the cache registration address management system 241 carries out the above-described entry registration steps (1) to (6).

Step 5. End.

Figure 15:
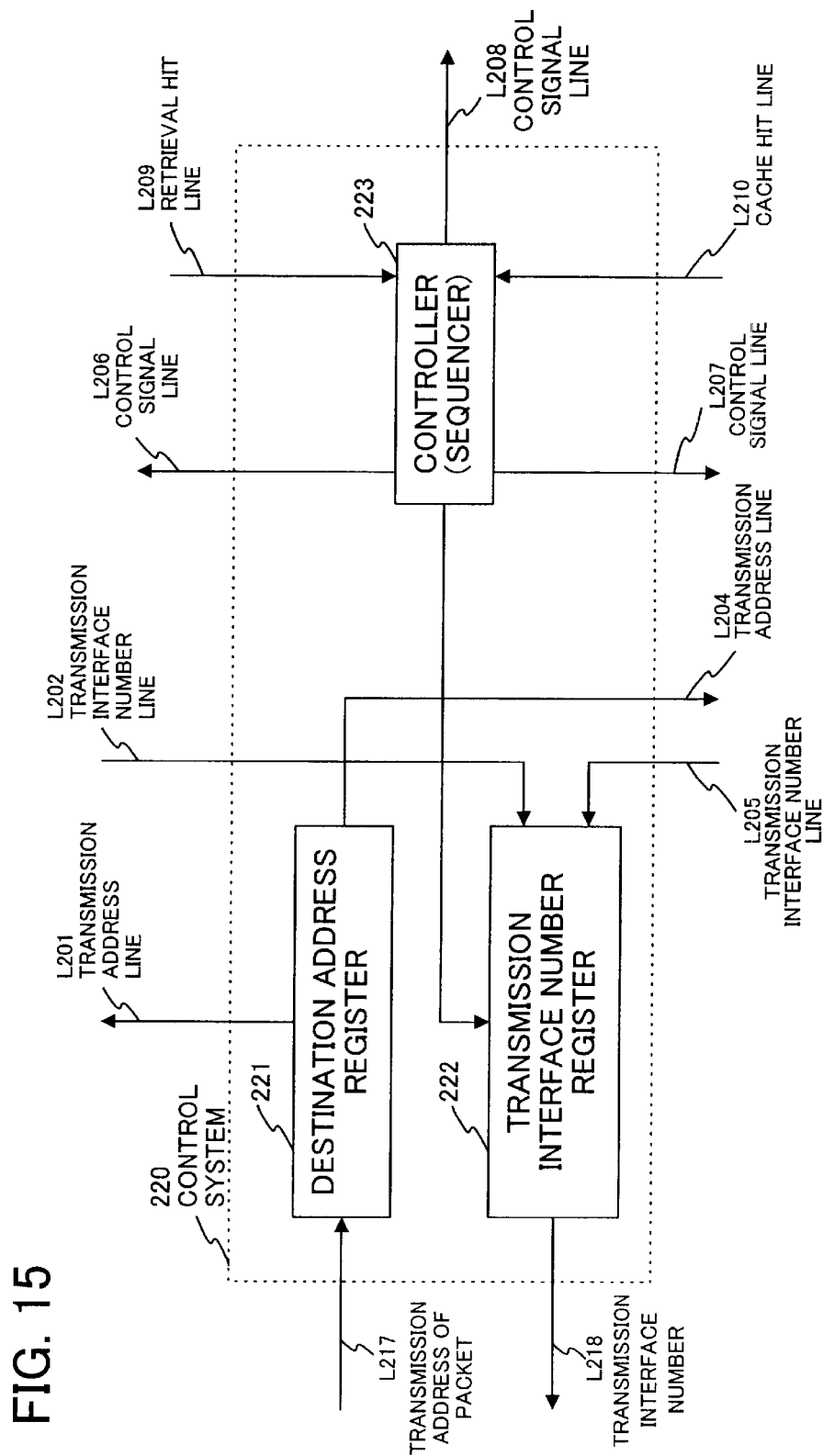
FIG. 15 is a detailed configuration diagram of a control system 220 in the second embodiment.

FIG. 15 is a detailed diagram of the control system 220. A destination address register 221 stores a destination address (inputted via L217) of a packet inputted to the control system 220 and outputs the value to the destination address line L201 and destination address line L204. The control circuit 223 has a sequencer, which is operated as follows.

When the destination address of a packet is inputted to the control system 220, it starts the operation and makes the control signal line L207 active. Next, when the cache hit line L210 is set to a hit value, a value of the transmission interface number line L205 is fetched and stored into the transmission interface number register 222 and a transmission interface number is outputted to the line L218. When the cache hit line L210 is set to a non-hit value, the control signal line L206 is made active. Further, when the retrieval hit line L209 is set to a hit value, the control signal line L208 is made active. Further, a value of the transmission interface number line L202 is fetched and stored into the transmission interface number register 222 and a transmission interface number is outputted to the line L218. When it is not set to the hit value, error processing is carried out. Then, all the control signal lines L207, L206, L208 are made inactive and stopped.

Next, an operation of the second embodiment will be described with reference to a flow chart of FIG. 16.

Figure 16:
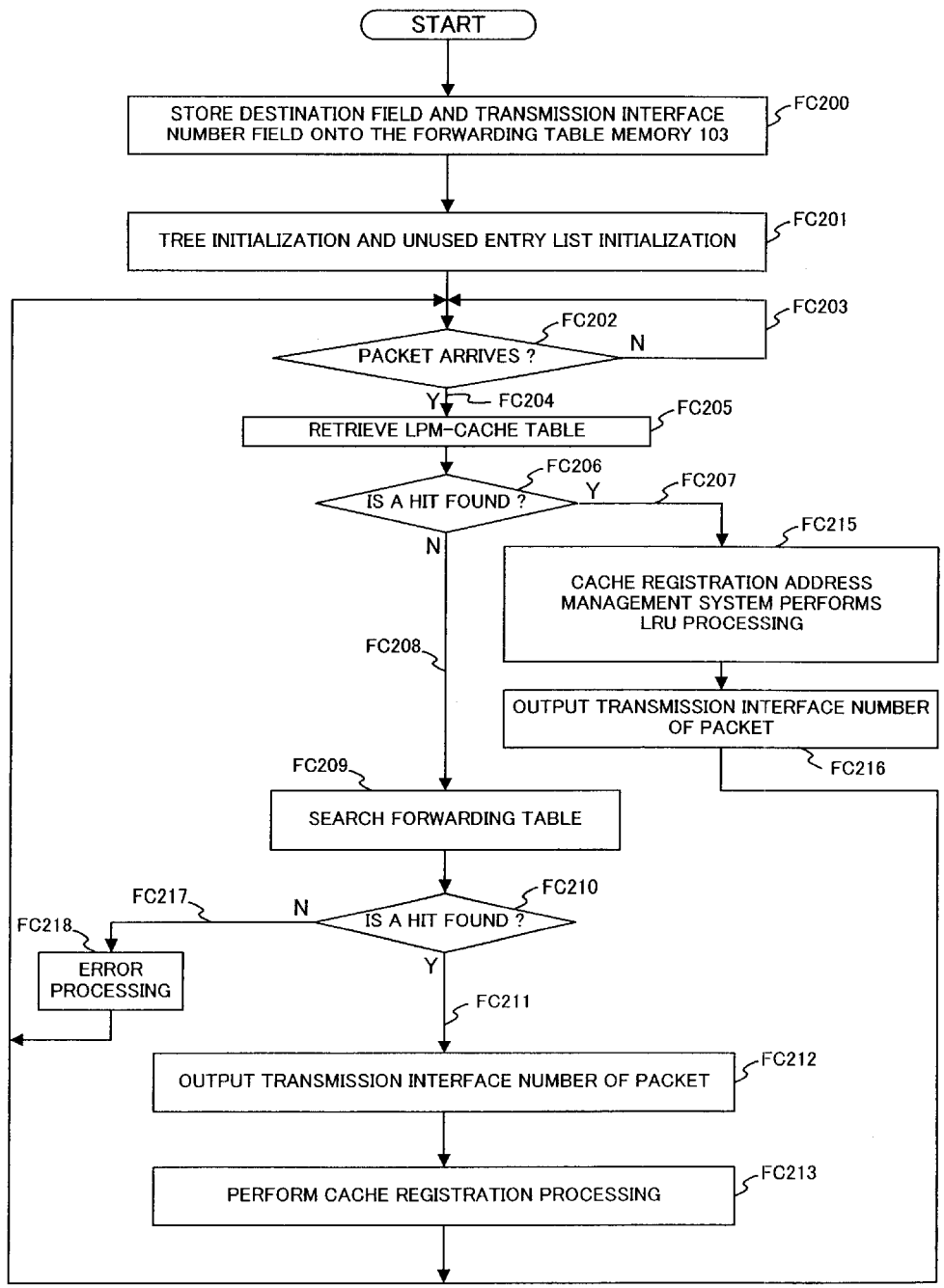
FIG. 16 is a flow chart for explaining an operation of the second embodiment.

Referring to FIG. 16, a forwarding table is stored in the forwarding table memory 203 (step FC200). Next, in the LPM cache registration system 240, the tree initialization system 242 carries out the above-described tree initialization procedure (when a resident entry is registered, it is also carried out). Then, the cache registration address management system 241 initializes the unused entry list (FC201).

When a packet arrives at the router (FC204), the destination address of the packet is inputted to the control system 220 through the line L217. This destination address is stored in the destination address register 221 in the control system 220 and is outputted to the destination address lines L201, L204. Next, the control circuit 223 in the control system 220 makes the control signal line L207 active and the LPM cache table retrieval system 230 searches the LPM cache table using a value of the destination address line L204 (FC205).

When a hit is found in the LPM cache table (FC207), the cache hit line L210 is set to the hit value and a pointer to the tree node of an entry hit in the LPM cache table is outputted to the tree-node pointer line L215. Further, the transmission interface number of the hit entry is outputted to the transmission interface number line L205. At this time, the cache registration address management system 241 receives a value of the tree-node pointer line L215 after the cache hit line L210 is set to the hit value, and changes the two-way link list of the in-use tree node list using the aforementioned LRU management procedure (FC215). After the cache hit line L210 is set to the hit value, the control system 220 stores a value of the transmission interface number line L205 into the transmission interface number register 222 and outputs the transmission interface number of the packet through the line L218 (FC216).

When no hit is found in the LPM cache table (when the processing proceeds to FC208 in FIG. 16), the cache hit line L210 is set to the non-hit value and the controller 223 in the control system 220 makes the control signal line L206 active. After the control signal line L206 is made active, the forwarding table retrieval system 200 fetches the destination address of a packet through the destination address line L201 and the table retrieval system 201 carries out the LPM retrieval on the forwarding table (FC209). When an entry is found as a result of the retrieval (FC211), the retrieval hit line L209 is set to the hit value. Then, the transmission interface number of the found entry and the pointer of the tree are outputted to the transmission interface number line L202 and tree-node pointer line L203 (FC212). After the retrieval hit line L209 is made active, the control system 220 makes the control signal line L208 active. After the control signal line L208 is made active, the LPM cache registration system 240 executes the aforementioned cache registration procedure (FC213) and registers the destination of a tree node to be registered, transmission interface number and pointer to the tree node in the LPM cache table of the LPM cache table retrieval system 203. When no entry is found as a result of the LPM retrieval on the forwarding table (FC217), the retrieval hit line L209 is set to the non-hit value. After the retrieval hit line L209 is set to the non-hit value, the control system 220 carries out error processing (FC218).

It is also permissible to prepare a flag for indicating whether the tree node should be registered onto the cache and to determine whether the registration procedure should be carried out depending on that flag at the beginning of the cache registration procedure step (1).

Hereinafter, an example of operation or the second embodiment will be described. Here, assume that the network address is 32 bits. Further, assume that nothing is registered in the LPM cache entry in initial state, the cache capacity is 5 entries, addresses 1 to 4 are used as the update entry area and the address 5 is used as the resident entry area.

First, assume that the forwarding table of the router is as shown in FIG. 36 and an entry of address 7 is always registered in the cache as a resident entry.

In the step FC201 on the flow chart of FIG. 16, the tree is initialized by the tree initialization system 242 of the LPM cache registration system 240. As a result, the tree is initialized as shown in FIG. 17.

Figure 17:
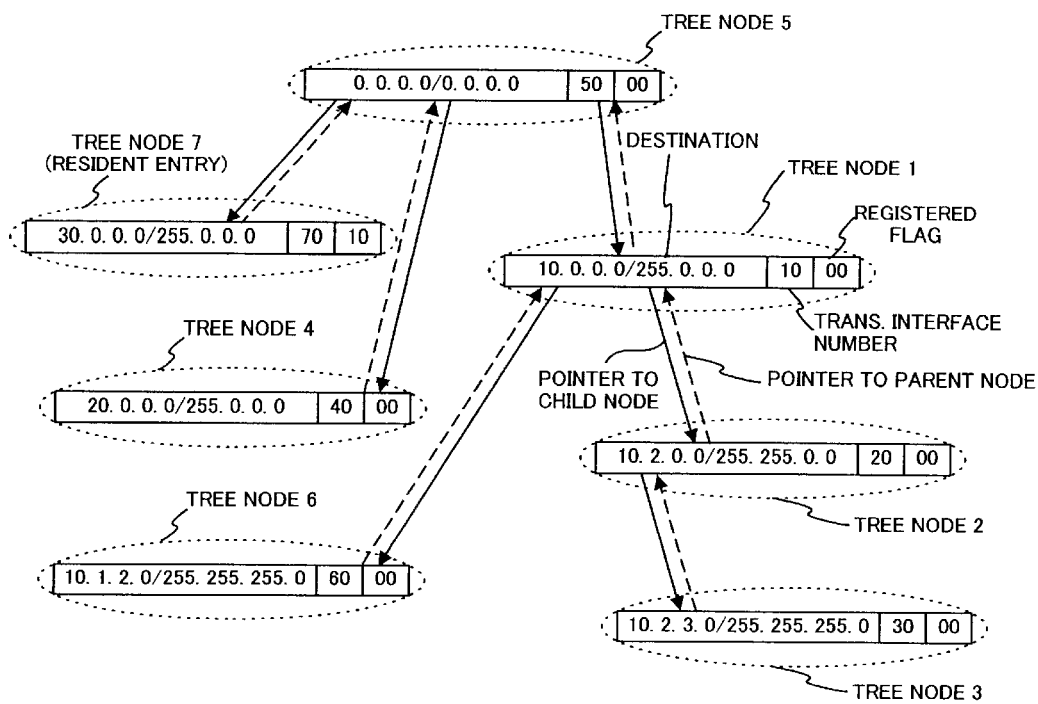
FIG. 17 is a diagram showing changes of the tree node, unused entry list and in-use tree list managed by the LPM cache registration system 240 in the second embodiment.
Figure 17:
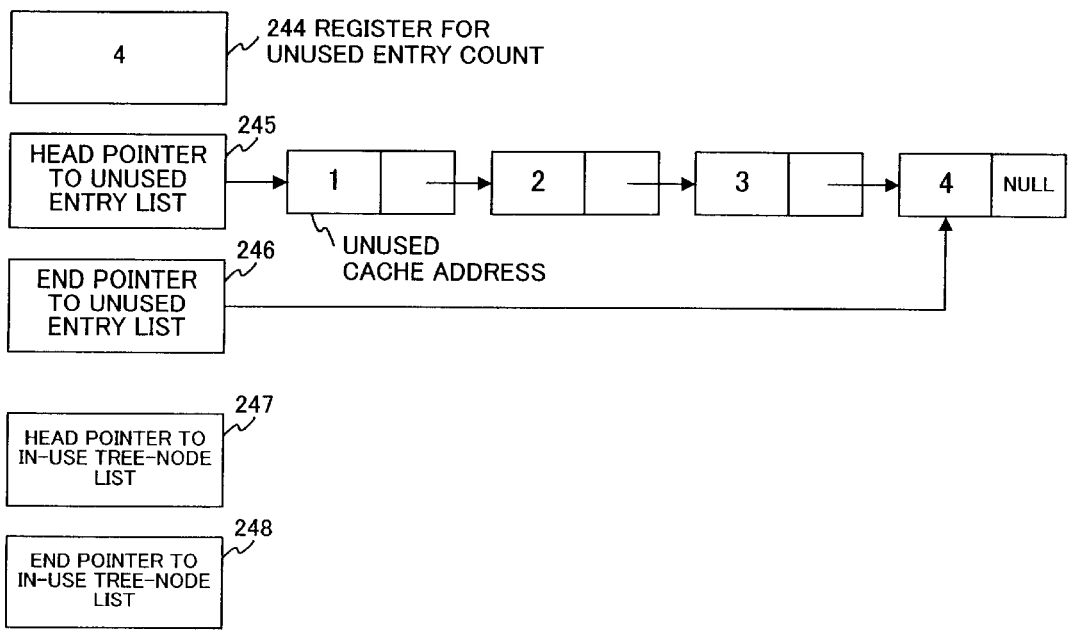

In FIG. 17, the pointer to the parent node in the tree node, the head pointer to the child node list, and the child node list are omitted and the pointer to the parent node is expressed with dotted line and the pointer to the child node is expressed with solid line. The unused entry list is also initialized as shown in FIG. 17. since the capacity of the updated entry in the cache is 4, the value of 4 is stored in the unused entry count register 244. Assuming that addresses for storing the tree nodes 1 to 7 in the management memory 243 of the LPM cache registration system 240 are addresses 1 to 7, the forwarding table is as shown in FIG. 37. The LPM cache table is as shown in FIG. 38.

Figure 18:
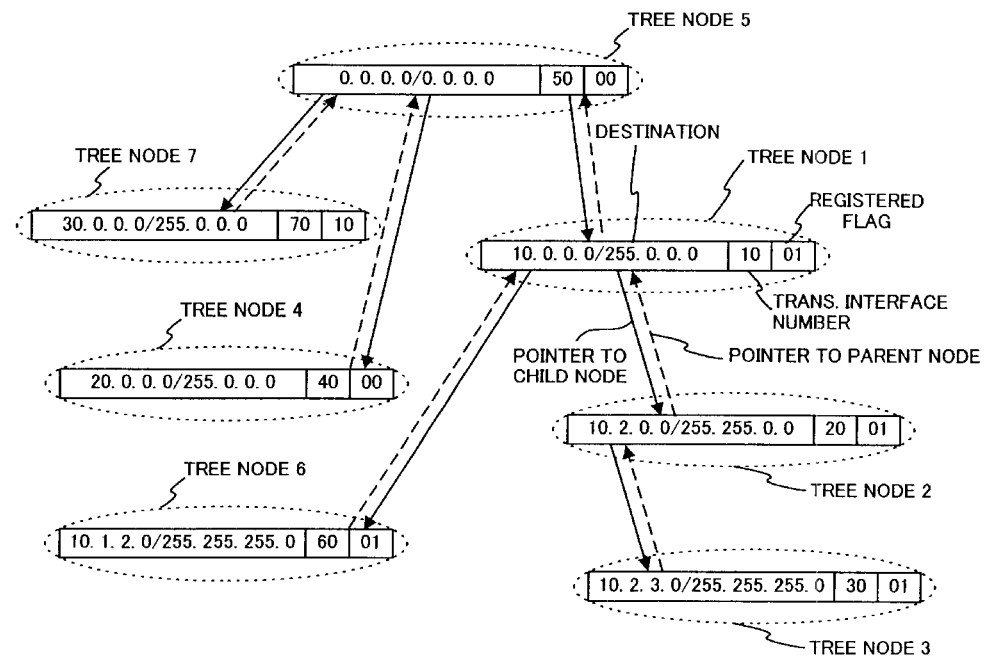
FIG. 18 is a diagram showing changes of the tree node, unused entry list and in-use tree list managed by the LPM cache registration system 240 in the second embodiment.
Figure 18:
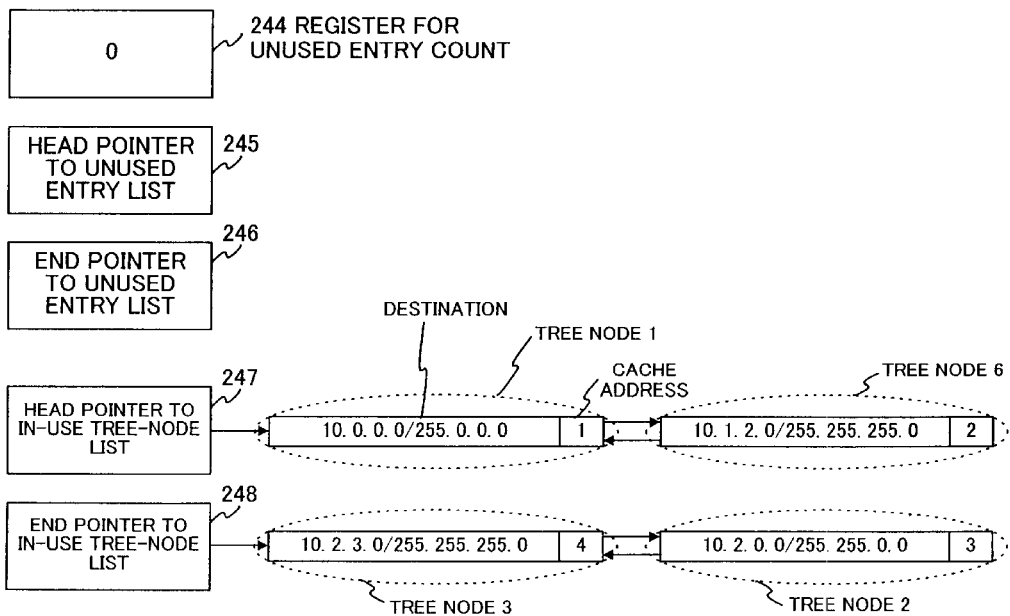

Next, it is assumed that packets having the destination addresses of 10.5.1.1, 10.1.2.3, 20.1.2.3 arrive in this order. When a packet of the destination address 10.5.1.1 arrives, the LPM cache table retrieval system 230 carries out the LPM retrieval on the LPM cache table by using 10.5.1.1 as a retrieval key. There is no matching entry in the LPM cache table. Thereafter, the forwarding table is subjected to the LPM retrieval by using 10.5.1.1 as a key. As a result, the address 1 is hit and the value of 10 is outputted to the transmission interface number line L202 and the value of 1 is outputted to the tree-node pointer line L203. The control system 220 determines the transmission interface number to be 10 using a value of the line L202 and outputs it to the line L218. At the same time, in the LPM cache registration system 240, the value of the L203 which is 1 is stored in the pointer register 249 and the cache registration step (1) is carried out. According to the value of the pointer register 249, tree node 1 of FIG. 17 and all subordinate tree nodes, namely four tree nodes 1, 2, 3, 6 are selected. In the cache registration step (2), this value 4 is compared with the value 4 of the unused entry count register 244 and thereafter the processing proceeds to cache registration step (4). In the cache registration step (4), the entry registration steps (1) to (6) are carried out by the cache registration address management system 241. The tree list, unused entry list and in-use tree list are changed as shown in FIG. 18. Since the number or the nodes in the unused entry list is 0, the unused entry count register 244 is set to 0. The LPM cache table is as shown in FIG. 39.

Figure 19:
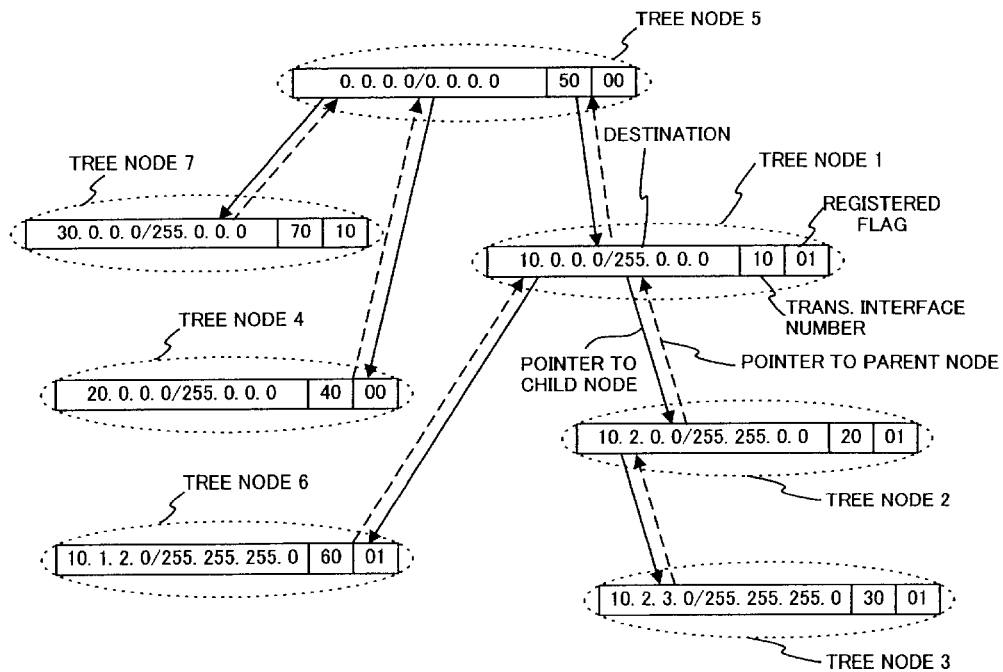
FIG. 19 is a diagram showing changes of the tree node, unused entry list and in-use tree list managed by the LPM cache registration system 240 in the second embodiment.
Figure 19:
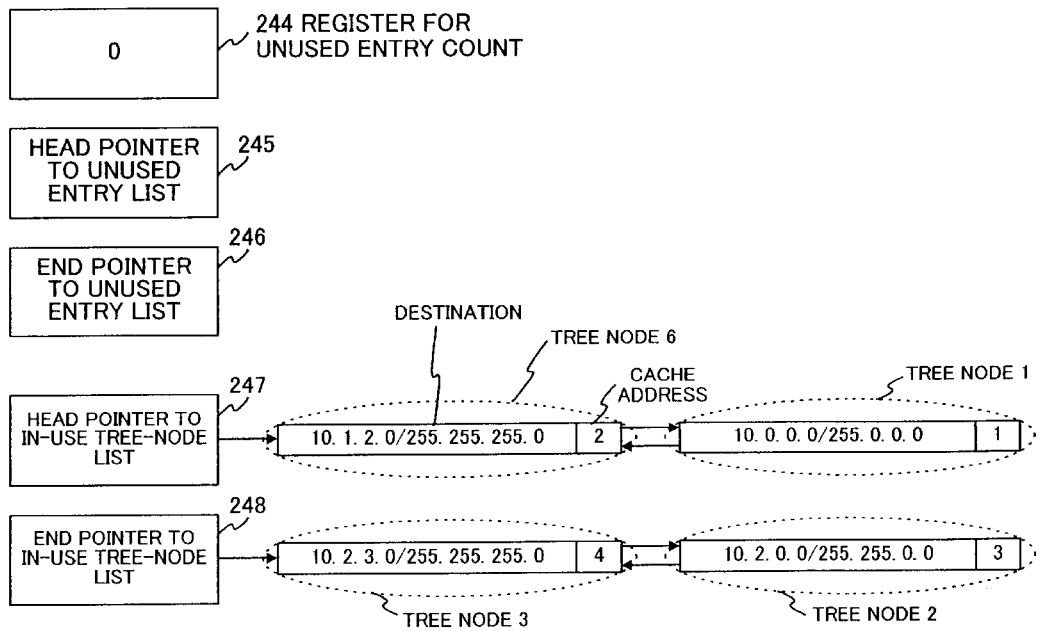

Next, when a packet having the destination address of 10.1.2.3 arrives, the LBM cache table is subjected to the LPM retrieval by using 10.1.2.3 as a key. As a result, address 2 is hit so that the cache hit line L210 is made active. The transmission interface number "60" of a hit entry is outputted to the transmission interface number line L205. A value of 6 of the tree-node pointer field of the hit entry is outputted to the tree-node pointer line L215. The control system 220 determines the packet transmission interface number to be 60 from the value of the LL205 and outputs it to the L218. After the cache hit line L210 is made active, the cache registration address management system 241 carries out the LRU management steps (1) to (3). As a result, the tree node 6 is brought to the head of the in-use tree node list, as shown in FIG. 19.

When the packet having the destination address of 20.1.2.3 arrives, in the LPM cache table retrieval system 230, the LPM cache table is subjected to the LPM retrieval by using 20.1.2.3 as a key. Since there is no matching entry in the LPM cache table, no entry is hit and next, the forwarding table is searched by using 20.1.2.3 as a key. As a result, the address 4 is hit. A value of 40 is outputted to the transmission interface number line L202 and 4 is outputted to the tree-node pointer line L203. The control system 220 determines the transmission interface to be 40 from the value of the L202 and outputs it to the L218. At the same time, the LPM cache registration system 240 stores the value 4 of the L203 in the pointer register 249 and carries out the cache registration step (1). From the value of the pointer register 249, a tree node 4 of FIG. 17 and all subordinate tree nodes, namely, a tree node of the tree node 4 is selected. In the cache registration procedure 2, this value of 1 is compared with the value 0 of the unused entry count register 244. As a result of the comparison, the processing proceeds to the cache registration step (3). In the cache registration step (3), the cache registration address management system 241 carries out the aforementioned entry deletion procedure.

Figure 20:
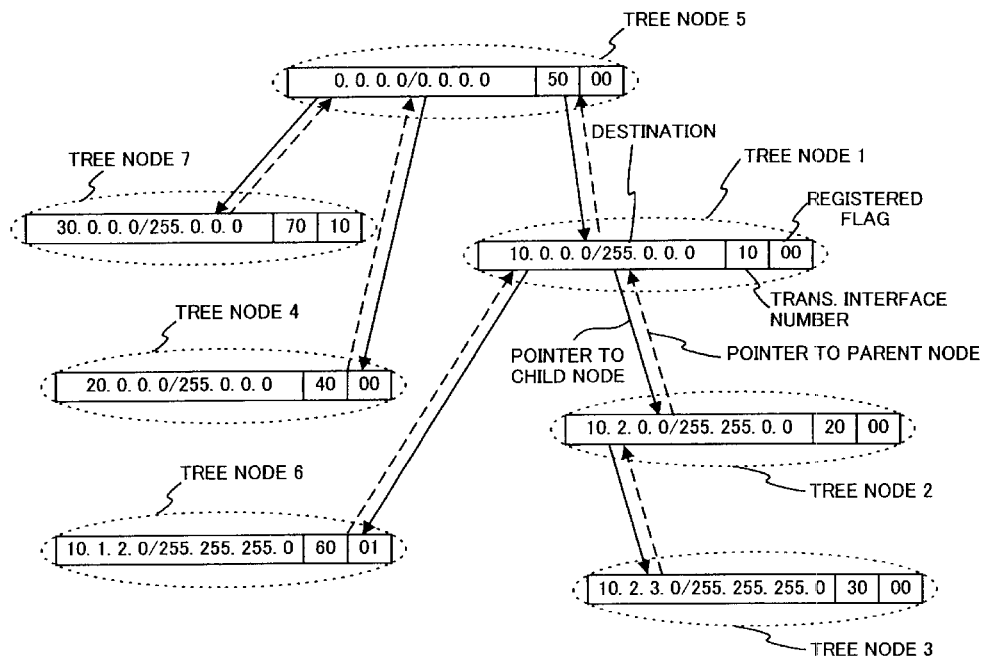
FIG. 20 is a diagram showing changes of the tree node, unused entry list and in-use tree list managed by the LPM cache registration system 240 in the second embodiment.
Figure 20:
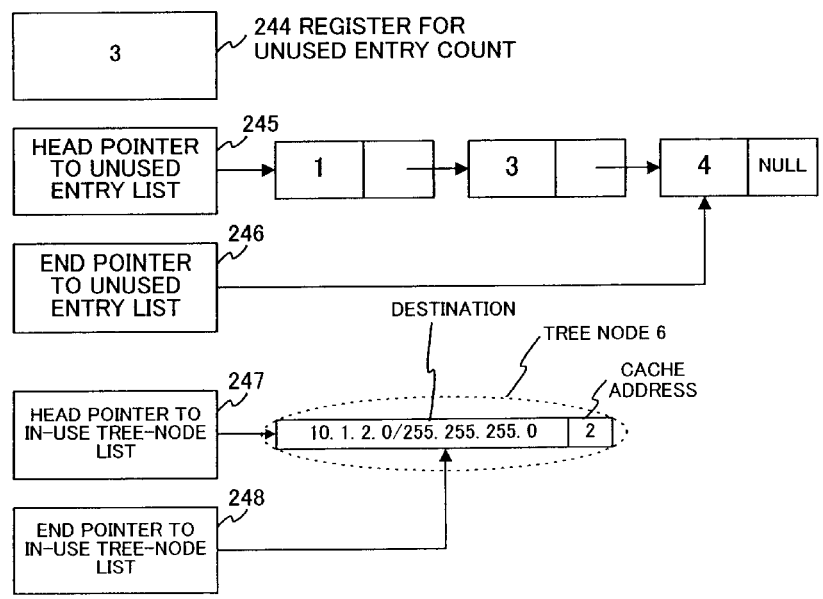

In the entry deletion step (1), the end pointer 241 of the in-use tree node list is read (indicating an entry which should be deleted by the LRU algorithm)), the tree node 3 is selected. In the entry deletion step (2), the tree is traced in the direction to the parent node. About a node whose registered flag is set to "01", namely the tree nodes 3, 2, 1, the registered flag is set to "00" so as to obtain a cache address written in the tree node. For the tree nodes 3, 2, 1, the cache addresses are 4, 3, 1, respectively. When the entry deletion steps (3) and (4) are executed, the tree list, unused entry list and in-use tree list are changed as shown in FIG. 20. In the LPM cache table, the addresses 4, 3, 1 are deleted and the cache table is changed as shown in FIG. 40.

Figure 21:
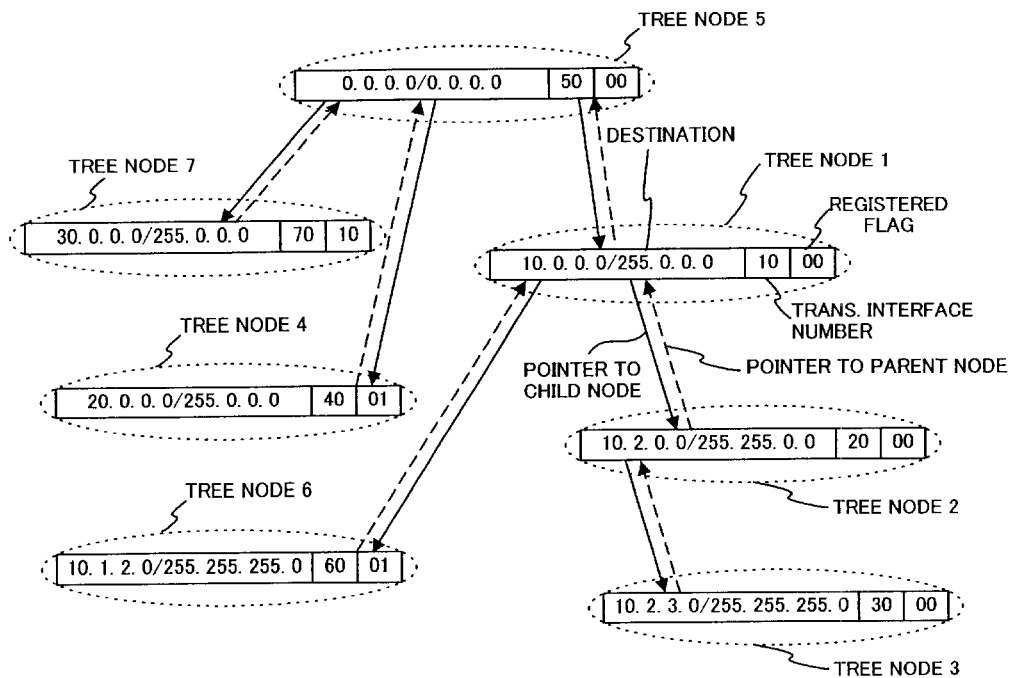
FIG. 21 is a diagram showing changes of the tree node, unused entry list and in-use tree list managed by the LPM cache registration system 240 in the second embodiment.
Figure 21:
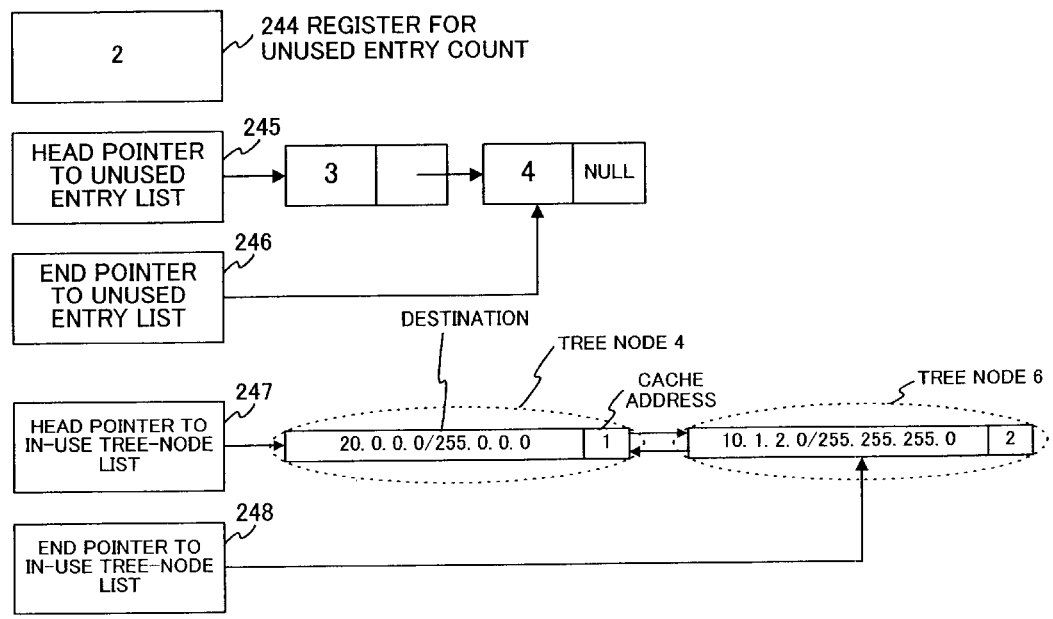

The entry deletion procedure is up to here. When the cache registration step (3) is executed, the processing is returned to the cache registration step (1) so that the cache registration step (1) is carried out. When the cache registration step (1) is executed, since the value of the pointer register is 4, the tree node 4 in FIG. 17 and all the subordinate tree nodes, namely, a single tree node of the tree node 4 is selected. Since the value of the unused entry count register 244 is changed to 3 in the cache registration step (2), 3 is compared with the number 1 of the selected tree node. Then, the processing proceeds to the cache registration step (4). In the cache registration step (4), the entry registration steps (1) to (6) are executed to store the tree node 4 in the cache. As a result, the tee list, the unused entry list and the in-use tree list are changed as shown in FIG. 21. The LPM cache table is changed as shown in FIG. 41.

Here, it will be explained that according to the second embodiment, even when a hit is found, a proper transmission interface number can be determined. As for the relation between the parent node and child node according to the second embodiment, a relation that the parent node includes the child nodes is established in a set of network addresses indicated by the destination of the tree node. Thus, according to the cache registration method of the second embodiment, all entries having destinations included by a set of the network address indicated by an entry hit by the retrieval in the forwarding table are registered. Thus, the entry of the registered cache is part of the forwarding table, however it is provided with a proper pair of a destination and a transmission interface number. Upon deletion of the cache entry, according to the entry deletion procedure of the cache registration address management system 241, the cache entry is deleted so as to prevent an occurrence of a case where of arbitrary two tree nodes, the upper node of the tree is registered in the cache while the lower node is not registered.

It can be indicated that the cache registration address management system 241 can be so constructed that, of entries in the cache table, there is an entry always used while excluded from an object of the LRU algorithm. This resident entry has a restriction. This will be described here. The restriction is that as for entries in the forwarding table always registered in the cache, the forwarding table entries corresponding to all the nodes under corresponding tree node (child nodes) need to be registered. For example, as for the entries always registered in the forwarding table of a previous operation example, the restriction is:

a single entry corresponding to the tree node 4 needs to be always registered.

The entry 4 corresponding to the tree nodes 1, 6, 2, 3 needs to be always registered.

In any case, all entries corresponding to nodes subordinate to a tree node corresponding to an arbitrary registered entry are registered.

THIRD EMBODIMENT

Figure 22:
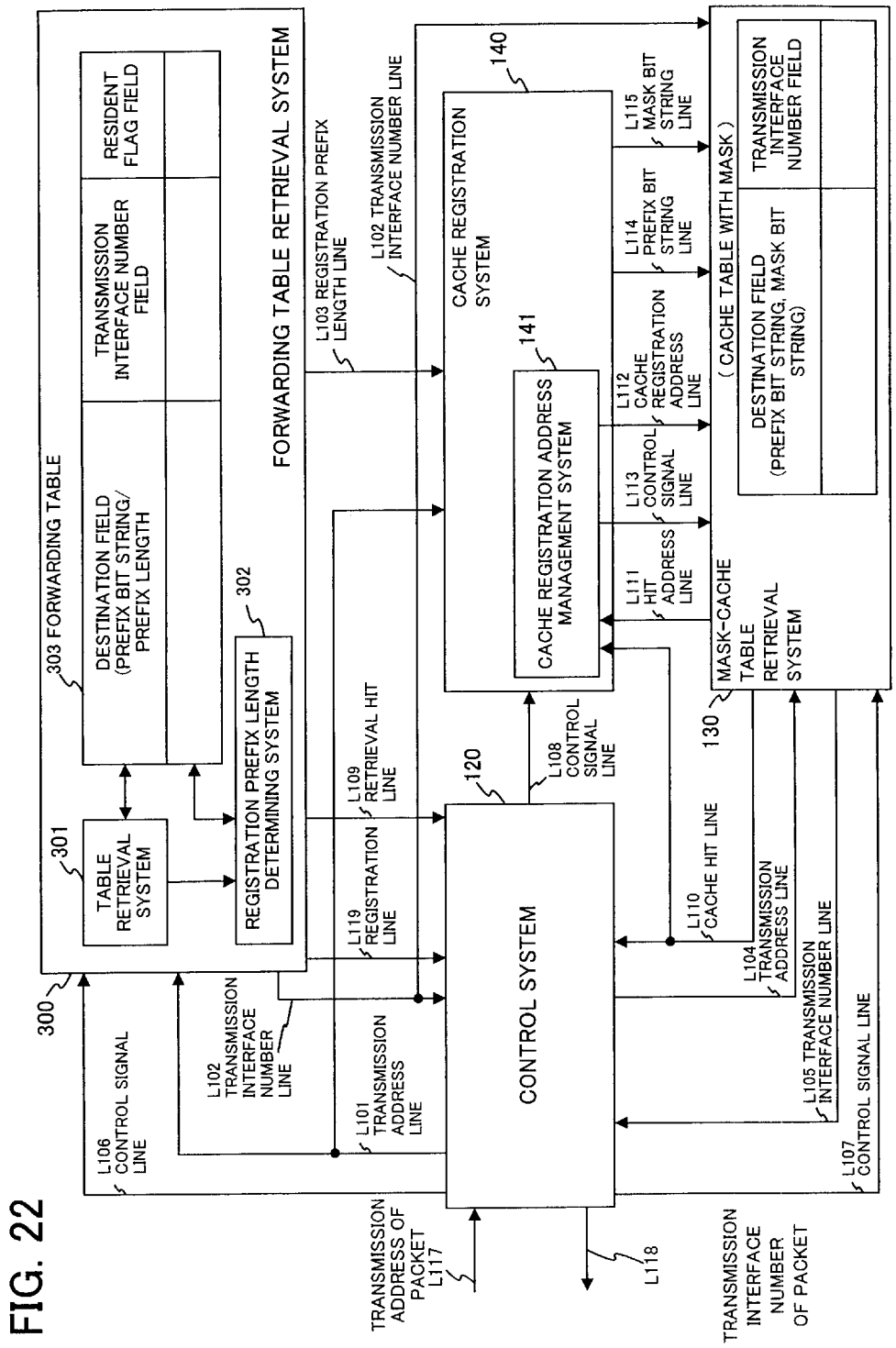
FIG. 22 is a configuration diagram of a route determining device for use in a router with a cache according to a third embodiment of the present invention.
Figure 23:
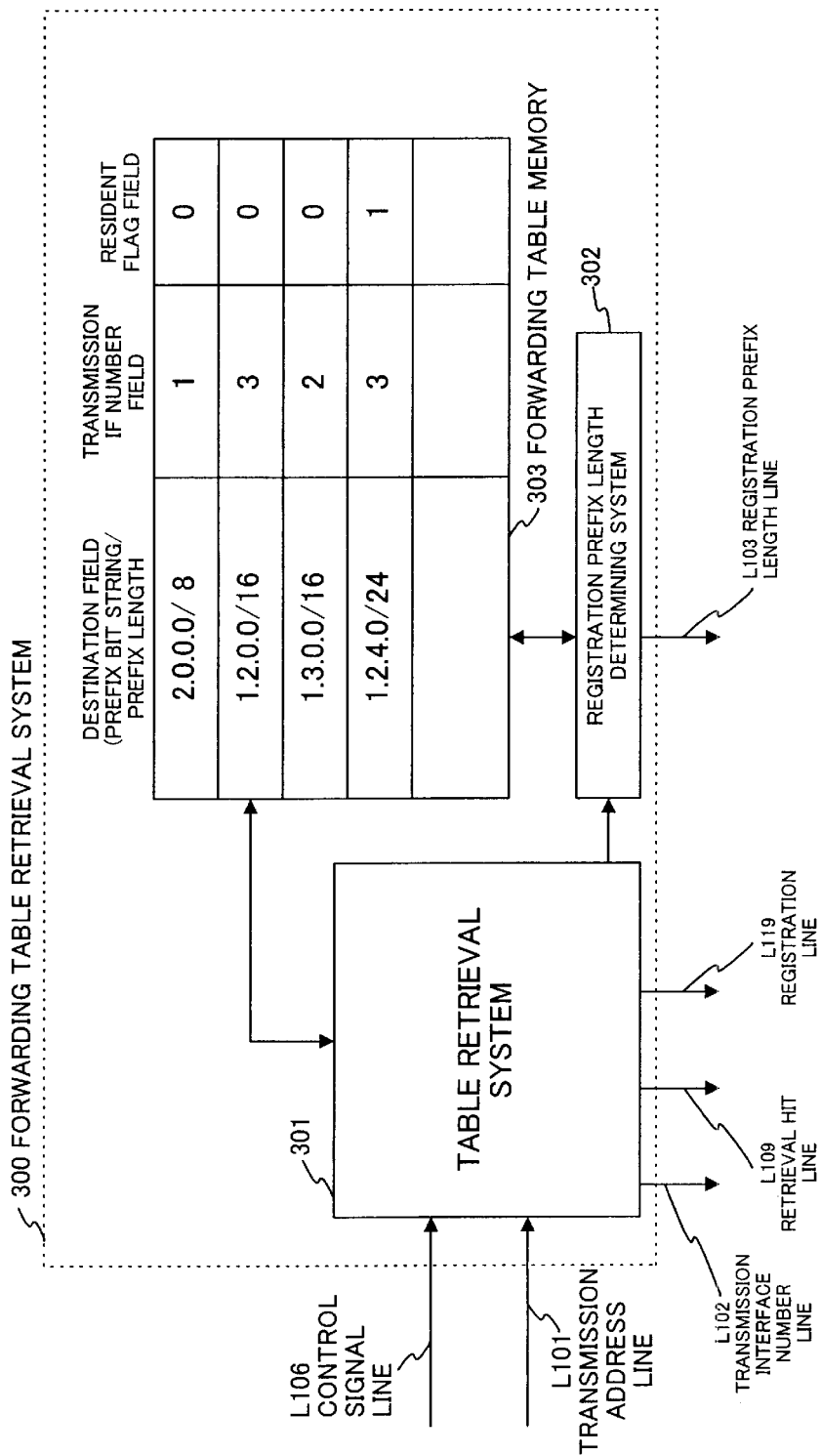
FIG. 23 is a detailed configuration diagram of a forwarding table retrieval system 300 in the third embodiment.

FIG. 22 shows a configuration diagram of the third embodiment. The third embodiment is so constructed by replacing the forwarding table retrieval system 100 of the first embodiment with a forwarding table retrieval system 300. The control system 120, cache registration system 140, and mask-cache table retrieval system 130 are the same as the first embodiment, and connections L101 to L119 of the respective systems are also the same. Hereinafter, the forwarding table retrieval system 300 which is different from the first embodiment will be described.

The registration prefix length determining system 302 receives the prefix bit string and the prefix length of an entry hit by the forwarding table retrieval from the table retrieval system 301 and determines the optimum cache prefix length according to the registration prefix length decision procedure which will be described hereinafter. The obtained registration prefix length is outputted to the registration prefix line L103.

Registration Prefix Length Decision Procedure

Step 1. Assuming that P and L are the prefix bit string and the prefix length of an entry hit by the forwarding table retrieval, respectively.

Step 2. Assuming that E is address 1, PE=L, and a counter c is set to 0.

Step 3. If E is not greater than the number of entries in the forwarding table, then the step (4) is executed, otherwise the processing goes to the step (7).

Step 4. An upper bit match count is obtained using the prefix bit string, the prefix length, P, and L of an entry having the address of E.

Step 5. If the upper bit match count obtained in the step (4) is greater than PE, then PE is replaced with the obtained upper bit match count and C is set to 1, and if the obtained upper bit match count is equal to PE, then C is incremented by one (C=C+1).

Step 6. The address of E is incremented by one and then the processing goes back to the step (2).

Step 7. If PE is greater than L, then the registration prefix length is set to PE+1. If PE is equal to L and C is equal to or greater than 2, then the registration prefix length is set to PE+1. If PE=L and C=1, then the registration prefix length is set to PE.

Step 8. End.

The above procedure can be readily implemented with circuit.

The components other than the above-described components are the same as in the first embodiment. Therefore, the details thereof are omitted.

The operation of the third embodiment can be described by removing the registration prefix length decision procedure FC101 from the flow chart as shown in FIG. 8 and inserting the above-described registration prefix length decision procedure (steps 1–8) between the steps FC112 and FC113 in the flow chart as shown in FIG. 8. The other steps are the same as in the flow chart as shown in FIG. 8.

Hereinafter, it will be explained that according to the third embodiment, a proper transmission interface number can be determined even when a hit is found in the cache. In other words, it can be shown that the following conditions (1) and (2) are both satisfied:

(1) A set of network addresses indicated by the destination address of an entry to be registered is the same as or included in a set of addresses indicated by an entry hit by retrieval; and (2) The set of network addresses indicated by the destination address of an entry to be registered does not include any of sets of addresses indicated by other entries of the forwarding table.

Actually, the registration prefix length of an entry to be registered is equal to or longer than that of a hit entry of the forwarding table. This is shown by the registration prefix length decision step (2), that is, the initialization of PE and the registration prefix length decision step (7). Further, the prefix bit string of an entry to be registered into the cache matches with that of an entry hit by retrieval for at least the prefix length of a hit entry in the forwarding table in the direction from the uppermost bit to lower bits. Therefore, the first condition (1) is satisfied. It is apparent that the second condition (2) is satisfied in the case where the registration prefix length is the maximum upper bit match count plus 1. In the case where the registration prefix length is the maximum upper bit match count, it means that the destination of a cache entry to be registered is the same as that of a hit entry. Therefore, in this case, the second condition (2) is also satisfied. As described above, the cache registration method according to the third embodiment can obtain a proper transmission interface number even when a hit is found in the cache.

Similarly to the first embodiment, an entry of the forwarding table, which can be resident in the mask-cache table, also has a restriction in the third embodiment. That restriction is that when there is another entry included in an entry hit in the forwarding table retrieval, the registered entry never include any one thereof.

FOURTH EMBODIMENT

Figure 24:
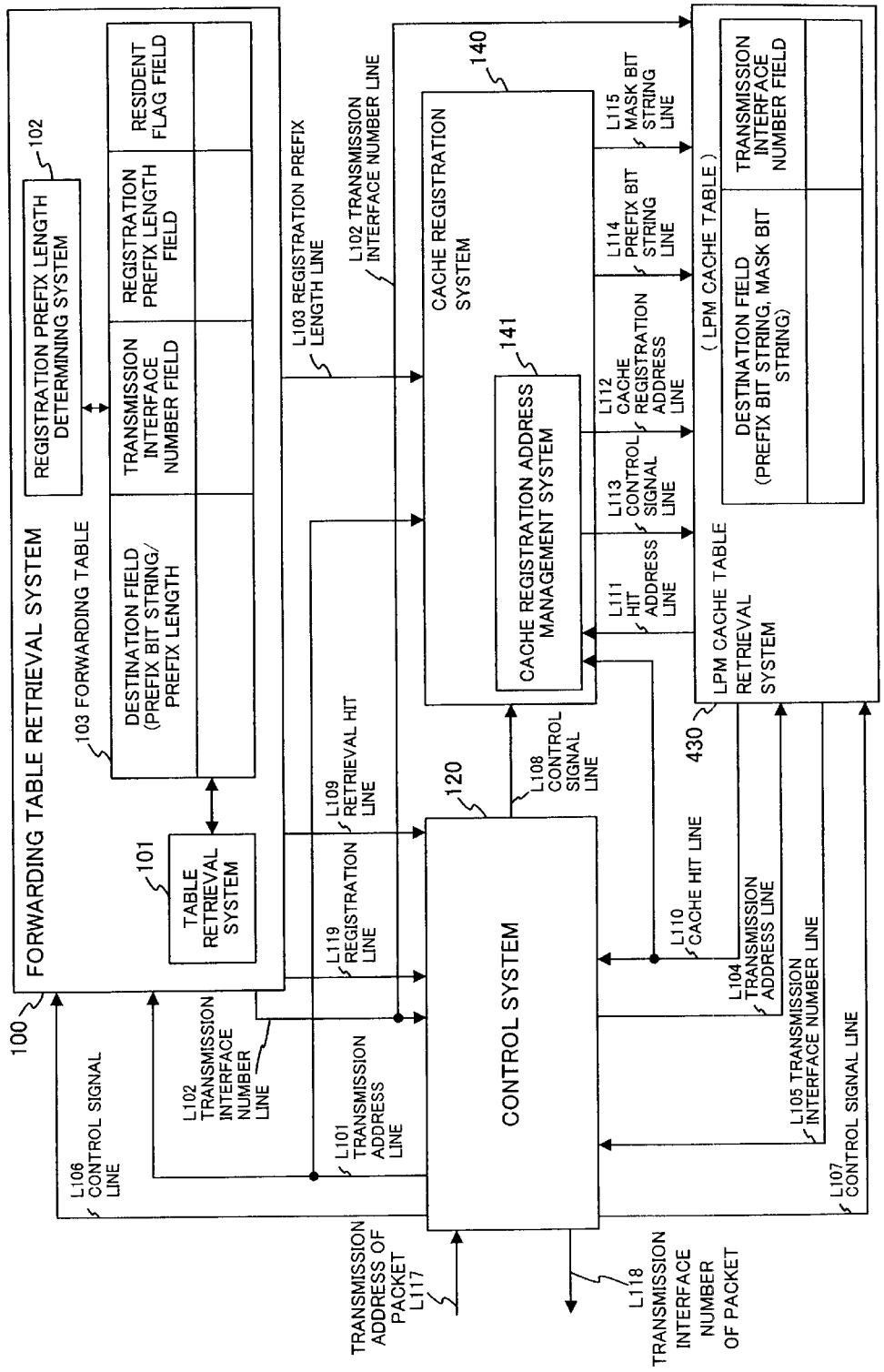
FIG. 24 is a configuration diagram of a route determining device for use in a router with a cache according to a fourth embodiment of the present invention.
Figure 25:
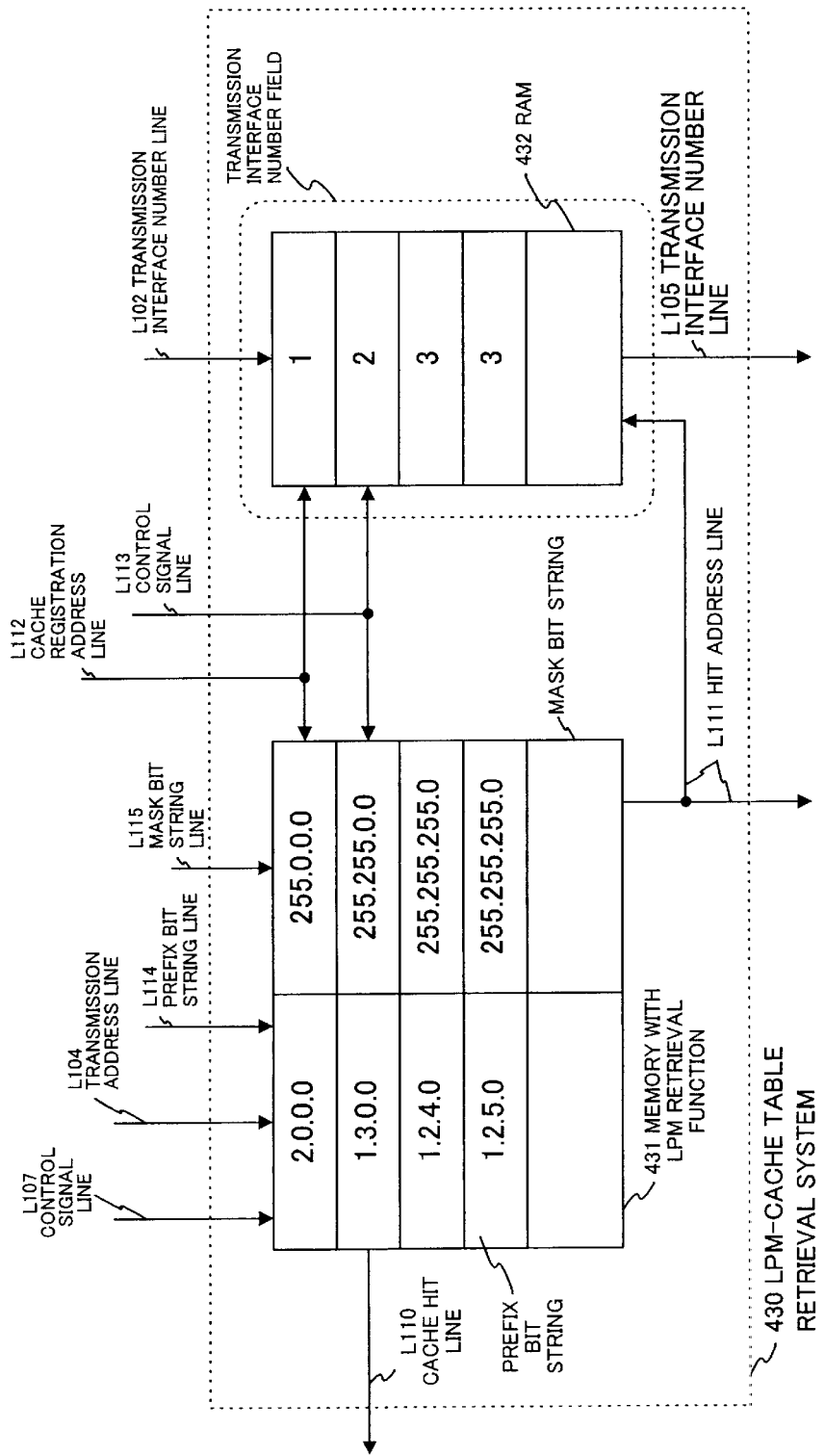
FIG. 25 is a detailed configuration diagram of a forwarding table retrieval system 430 in the fourth embodiment.

FIG. 24 is a diagram of a route determining system according to a fourth embodiment of the present invention, where circuit blocks similar to those previously described with reference to FIG. 2 are denoted by the same reference numerals and the details thereof are omitted.

LPM Cache Table Retrieval System 430

The LPM cache table retrieval system 430 includes an LPM cache table and a function of searching it. The LPM cache table has a destination field and a transmission interface number field. The destination field accommodates a pair of a prefix bit string indicating a network address and a mark bit string. The LPM cache table retrieval system 430 has a function of searching the LPM cache table. This is comprised of, for example, a memory with LPM retrieval function (hereinafter, called an LPM-retrieval memory) which is disclosed in Japanese Patent Application No. 9-234250 (filed on Aug. 29, 1997 by the present Applicant, Japanese Patent Application Laid-open No. 11-073782) and a RAM (random access memory).

When the control signal line L113 is made active, the entry is registered in the LPM cache table. This procedure is carried out in the following steps. In the LPM-retrieval memory 431, a prefix bit string inputted from the prefix bit string line L114 and a mask bit string inputted from the prefix bit string line L115 are stored at an address indicated by the cache registration address line L112. At the same time, a transmission interface number inputted from the transmission interface number line L102 is stored in the RAM 432 at an address (the same address as when stored in the LPM-retrieval memory 431) indicated by the cache registration address line L112. In entry deletion, when the control signal line L113 is set to a value indicating entry deletion, the cache entry at the address indicated by the cache registration address line L112 is deleted.

When the control signal line L107 is made active, retrieval is carried out. A destination address is inputted as a retrieval key into the LPM-retrieval memory 431 through the destination address line L104. The LPM-retrieval memory 431 performs LPM retrieval. When a hit is found (there is a matching entry), the cache hit line L110 is set to a set value and the address of the LPM-retrieval memory 431 registering the hit entry is outputted to the hit address line L111. Then, in the RAM 432, a transmission interface number written at the address indicated by the hit address line L111 is read out and that value is outputted to the transmission interface number line L105. When no hit is found, the cache hit line L110 is set to a non-hit value.

An operation of the fourth embodiment is the same as that of the first embodiment except for the LPM cache table retrieval system 430.

Here, it will be described that, according to the fourth embodiment, even when a hit is found in the LPM cache table, a proper transmission interface number can be determined.

According to the fourth embodiment, as for a set of prefix bit string, mask bit string, and transmission interface number, the LPM cache table retrieval system 430 stores the same cache entry as in the first embodiment but operates in LPM retrieval method which is different from the mask matching retrieval of the first embodiment. In the mask matching retrieval of the first embodiment, when a plurality of matching entries are found, any one of the found entries is obtained as a result of the mask matching retrieval. In the other hand, according to the LPM retrieval, an entry having the maximum length of consecutive 1s from the uppermost bit to lower bits in the mask bit string is obtained as a result of the LPM retrieval.

However, in the first embodiment, registration is not made so that a plurality of matching entries are found. Therefore, a transmission interface number obtained by the LPM cache table retrieval system 430 of the fourth embodiment will be identical to that obtained by the mask-cache table retrieval system 130 of the first embodiment. Therefore, the same reason as the first embodiment can be applied to the fourth embodiment. According to the fourth embodiment, a proper transmission interface number can be also determined even when a hit is found in the LPM cache table.

The restriction condition for a resident entry in the fourth embodiment is different from that in the first embodiment because their cache retrieval methods are different. The restriction condition in the first embodiment is that, when there is another entry included in an entry hit by the forwarding table retrieval, an entry to be registered never include any one thereof.

However, in the fourth embodiment, since a LPM-retrievable cache is employed, the restriction condition in the first embodiment is the same as in the second embodiment. That is, the restriction condition is that as for entries in the forwarding table always registered in the cache, the forwarding table entries corresponding to all the nodes under corresponding tree node (child nodes) need to be also registered.

For example, it is assumed that the forwarding table is as shown in FIG. 42. In this case, in order that the entry of address 2 is resident, it is necessary for the entry of address 3 to be also resident because a set of network addresses indicated by the destination address of the address 2 includes a set of network addresses indicated by the destination address of the address 3. An address set of an entry which can be resident is, for example, (address 2, address 3), (address 1, address 2, address 3, address 6), (address 4) or the like.

FIFTH EMBODIMENT

Figure 26:
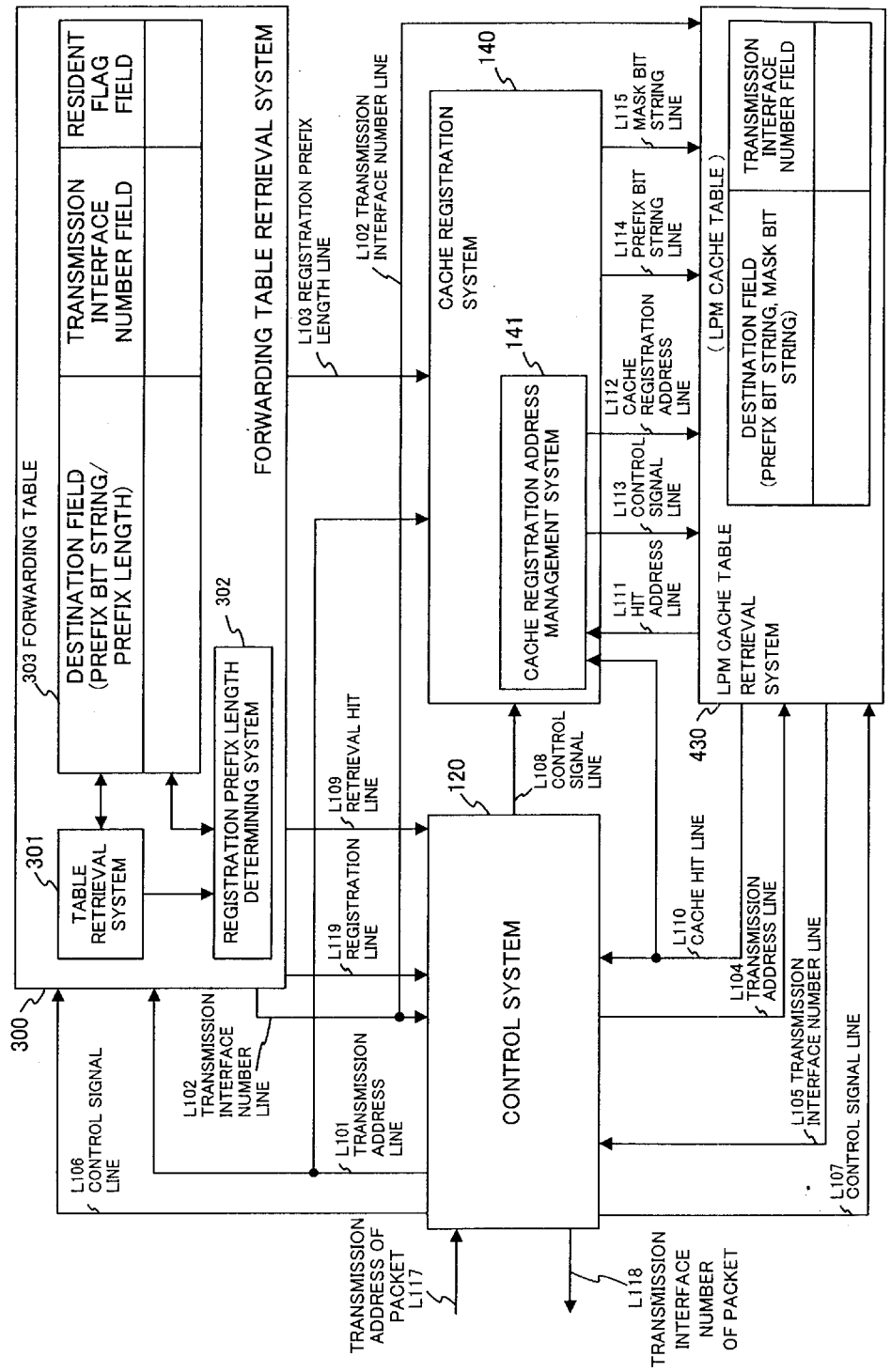
FIG. 26 is a configuration diagram of a route determining device for use in a router with a cache according to a fifth embodiment of the present invention.

FIG. 26 is a diagram of a route determining system according to a fifth embodiment of the present invention, where circuit blocks similar to those previously described with reference to FIGS. 2, 22, and 24 are denoted by the same reference numerals and the details thereof are omitted.

More specifically, the forwarding table retrieval system 300 in FIG. 26 is the same as that in FIG. 22. The control system 120 and the cache registration system 140 in FIG. 26 are the same as those in FIG. 2. The LPM cache table retrieval system 430 in FIG. 26 is the same as that in FIG. 24.

An operation of the fifth embodiment it the same as that of the third embodiment except for the LPM cache table retrieval system 430.

Here, it will be described that, according to the fifth embodiment, even when a hit is found in the LPM cache table, a proper transmission interface number can be determined.

According to the fifth embodiment, as for a set of prefix bit string, mask bit string, and transmission interface number, the LPM cache table retrieval system 430 stores the same cache entry as in the third embodiment but operates in LPM retrieval method which is different from the mask matching retrieval of the first embodiment. In the mask matching retrieval of the first embodiment, when a plurality of matching entries are found, any one of the found entries is obtained as a result of the mask matching retrieval. In the other hand, according to the LPM retrieval, an entry having the maximum length of consecutive is from the uppermost bit to lower bits in the mask bit string is obtained as a result of the LPM retrieval.

However, in the third embodiment, registration is not made so that a plurality of matching entries are found. Therefore, a transmission interface number obtained by the LPM cache table retrieval system 430 of the fifth embodiment will be identical to that obtained by the mask-cache table retrieval system 130 of the third embodiment. Therefore, the same reason as the third embodiment can be applied to the fifth embodiment. According to the fifth embodiment, a proper transmission interface number can be also determined even when a hit is found in the LPM cache table.

The restriction condition for a resident entry in the fifth embodiment is different from that in the third embodiment because their cache retrieval methods are different. The restriction condition in the third embodiment is that, when there is another entry included in an entry hit by the forwarding table retrieval, an entry to be registered never include any one thereof.

However, in the fifth embodiment, since a LPM-retrievable cache is employed, the restriction condition in the fourth embodiment is the same as in the second embodiment. That is, the restriction condition is that as for entries in the forwarding table always registered in the cache, the forwarding table entries corresponding to all the nodes under corresponding tree node (child nodes) need to be also registered.

For example, it is assumed that the forwarding table is as shown in FIG. 43. In this case, in order that the entry of address 2 is resident, it is necessary for the entry of address 3 to be also resident because a set of network addresses indicated by the destination address or the address 2 includes a set of network addresses indicated by the destination address of the address 3. An address set of an entry which can be resident is, for example, (address 2, address 3), (address 1, address 2, address 3, address 6), (address 4) and the like.

Figure 44:
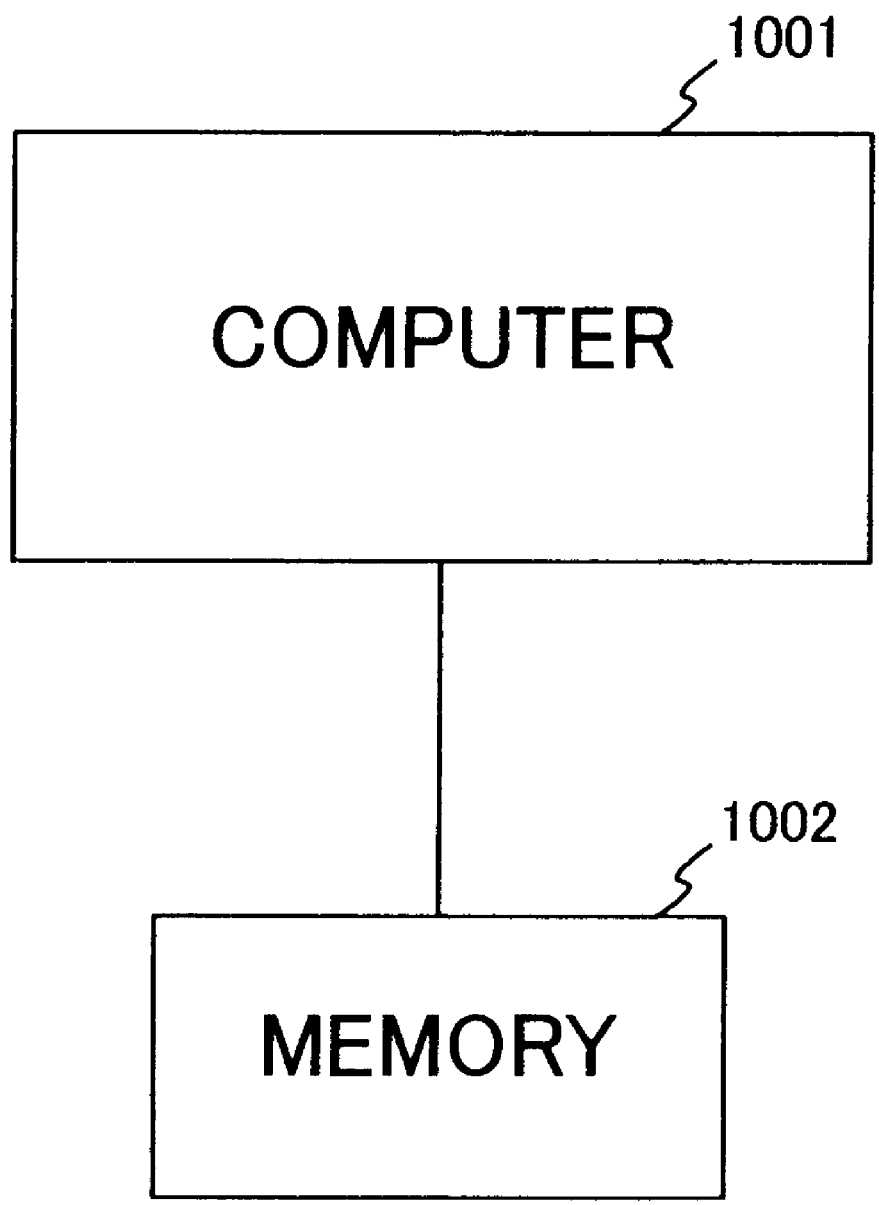
FIG. 44 is a block diagram showing an example of hardware structure for implementing the first to fifth embodiments.

FIG. 44 shows an example of circuit configuration which can implement the above embodiments. A computer 1001 having a cache memory therein is connected to a memory 1002. The memory 1002 may be a magnetic/optical disk, a semiconductor memory, or other recording medium. The memory 1002 stores a program which can run on the computer 1001 so that the computer 1001 functions as a route determining system for use in a router.

For example, the first embodiment is constructed by the computer 1001 controlled according to a first program stored in the memory 1002. More specifically, on the computer 1001, the forwarding table retrieval system 100, the control system 120, the mask-cache table retrieval system 130, and the cache registration system 140 are created and operated as described above by executing the first program.

The second embodiment is constructed by the computer 1001 controlled according to a second program stored in the memory 1002. More specifically, on the computer 1001, the forwarding table retrieval system 200, the control system 220. the LPM cache table retrieval system 230, and the LPM cache registration system 240 are created and operated as described above by executing the second program.

The third embodiment is constructed by the computer 1001 controlled according to a third program stored in the memory 1002. More specifically, on the computer 1001, the forwarding table retrieval system 300, the control system 120, the mask-cache table retrieval system 130, and the cache registration system 140 are created and operated as described above by executing the third program.

The fourth embodiment is constructed by the computer 1001 controlled according to a fourth program stored in the memory 1002. More specifically, on the computer 1001, the forwarding table retrieval system 100, the control system 120, the LPM cache table retrieval system 430, and the cache registration system 140 are created and operated as described above by executing the fourth program.

The fifth embodiment is constructed by the computer 1001 controlled according to a fifth program stored in the memory 1002. More specifically, on the computer 1001, the forwarding table retrieval system 300, the control system 120, the LPM cache table retrieval system 430, and the cache registration system 140 are created and operated as described above by executing the fifth program.

CONCLUSION

As described above, a router with a cache according to the present invention is provided with a cache allowing matching with different mask for each entry or allowing longest prefix matching. Therefore, a cache entry allowing a plurality of destination addresses to be hit can be registered in the cache, resulting in increased cache hit probability.

In the case of 8-bit network address, for example, assuming that the forwarding table stores two entries: 10110000/4:1 and 00000000/0:3, which are defined as shown in the following table I.

TABLE I

| Destination (prefix bit string/prefix length) | Transmission interface number |
| --- | --- |
| 10110000/4 | 1 |
| 00000000/0 | 3 |

Consider that a packet having destination address "10110001" arrives at first and thereafter sixteen packets having destination addresses "10110000" through "11011111" arrive sequentially, resulting in a total of seventeen packets arriving at the router.

When the first packet having destination address "10110001" arrives, the router with a cache which allows matching with different mask for each entry or allows longest prefix matching according to the present invention registers the cache entry: 10110000/11110000:1, which is defined as shown in the following table II.

TABLE II

| Destination (prefix bit string/mask bit string) | Transmission interface number |
| --- | --- |
| 10110000/11110000 | 1 |

In contrast, according to the prior art, the cache entry 10110001:1 (destination: transmission interface number) is registered into the cache. Therefore, when sequentially receiving the subsequent sixteen packets having destination addresses "10110000" through "11011111", only one destination address "10110001" is hit in the cache, resulting in cache hit probability of 1/17.

According to the present invention, when sequentially receiving the subsequent sixteen packets having destination addresses "10110000" through "11011111", all the destination addresses of the sixteen packets are hit in the cache, resulting in remarkably high cache hit probability of 16/17. Therefore, the router according to the present invention increases in cache hit probability by a factor of 16.

Further, according to the present invention, a router with a cache allows a circuit area of the router to be reduced by decreasing the capacity of the cache without decreasing the cache hit probability of the cache because a cache entry allowing a plurality of destination addresses to be hit can be registered in the cache. More specifically, in the above example, when the seventeen packets have passed through, only one cache entry 10110000/11110000:1 is registered in the cache because all the destination addresses of the sixteen packets are hit by the one cache entry in the cache.

In contrast, according to the prior art, when the seventeen packets have passed through, sixteen cache entries of destination addresses "10110000" through "11011111" are stored in the cache, increasing in occupied memory by a factor of 16.

What is claimed is:

1. A router for determining a forwarding direction of a received packet by referring to a cache table and a forwarding table depending on a destination address of the received packet, comprising:

a forwarding table retriever for retrievably storing a plurality of entries;

a cache table retriever for retrievably storing a plurality of cache entries, the cache table retriever capable of retrieval using a different mask for each cache entry;

a cache address determiner for determining a cache address at which a cache entry is registered; and a cache prefix length determiner for determining a cache prefix length as a length of upper bits of the destination address of the received packet which are not masked by a corresponding mask, wherein a cache address area storing cache addresses of the cache table is divided into a resident area and an update area, wherein the cache address determiner determines a cache address at which a cache entry is registered into the cache table, from cache addresses stored in the update area.

2. Router according to claim 1, wherein a cache entry which hits plural destination addresses with only a single cache entry can be registered in the cache so that cache hit probability is increased while decreasing capacity of the cache.

3. The router according to claim 1, wherein the cache prefix length determiner determines a maximum cache prefix length based on cache entries.

4. The router according to claim 1, wherein the cache prefix length determiner determines an optimum cache prefix length based on cache entries.

5. A router for determining a forwarding direction of a received packet depending on a destination address of the received packet, comprising:

a forwarding table for retrievably storing a plurality of entries each including a pair of prefix information and forwarding direction information;

a cache table for retrievably storing a plurality of cache entries each including a pair of cache prefix information and forwarding direction information;

a cache prefix length determiner for determining a cache prefix length of cache prefix information of a cache entry to be registered into the cache table based on the plurality of entries stored in the forwarding table; and a cache registration controller for registering the cache entry into the cache table when no hit is found in the cache table but in the forwarding table, wherein the cache prefix information of the cache entry is produced by combining the cache prefix length and the destination address of the received packet.

6. The router according to claim 5, wherein cache prefix length determiner determines a maximum cache prefix length of cache prefix information of a cache entry to be registered into the cache table.

7. The router according to claim 6, further comprising:

a cache table retriever for retrieving a cache entry from the cache table using the destination address of the received packet as a retrieval key, wherein a retrieved cache entry has cache prefix information matching the destination address of the received packet restricted by the maximum cache prefix length, and wherein if a retrieved cache entry is found, then the forwarding direction information of the retrieved cache entry is used to determine the forwarding direction of the received packet; and a forwarding table retriever for retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet.

8. The router according to claim 7, wherein the forwarding table retriever performs longest prefix match (LPM) retrieval.

9. The router according to claim 5, wherein cache prefix length determiner determines an optimum cache prefix length of cache prefix information of a cache entry to be registered into the cache table.

10. The router according to claim 9, further comprising:
a cache table retriever for retrieving a cache entry from the cache table using the destination address of the received packet as a retrieval key, wherein a retrieved cache entry has cache prefix information matching the destination address of the received packet restricted by the optimum cache prefix length, and wherein if a retrieved cache entry is found, then the forwarding direction information of the retrieved cache entry is used to determine the forwarding direction of the received packet; and
a forwarding table retriever for retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet.

11. The router according to claim 10, wherein the forwarding table retriever performs longest prefix match (LPM) retrieval.

12. The router according to claim 5, wherein a cache address area storing cache addresses of the cache table is divided into a resident area and an update area, wherein the cache registration controller determines a cache address at which the cache entry is registered into the cache table, from cache addresses stored in the update area.

13. A router for determining a forwarding direction of a received packet by referring to a cache table and a forwarding table depending on a destination address of the received packet, comprising:
a forwarding table retriever for retrievably storing a plurality of entries;
a cache table retriever for retrievably storing a plurality of cache entries, the cache table retriever capable of longest prefix match (LPM) retrieval;
a cache address determiner for determining a cache address at which a cache entry is registered; and
a table manager for managing the forwarding table in form of tree topology to determine, which entry is to be registered into the cache table and to be deleted from the cache table based on a result of retrieval an the forwarding table, wherein a cache entry which hits plural destination addresses with only a single cache entry can be registered in the cache so that cache hit probability is increased while decreasing capacity of the cache and wherein a cache address area storing cache addresses of the cache table is divided into a resident area and an update area, wherein the cache address determiner determines a cache address at which a cache entry is registered into the cache table, from cache addresses stored in the update area.

14. A router for determining a forwarding direction of a received packet depending on a destination address of the received packet, comprising:

a cache table for retrievably storing a plurality of cache entries each including a pair of cache prefix information and forwarding direction information;
a forwarding table for retrievably storing a plurality of entries each including a pair of prefix information and forwarding direction information;
an LPM cache table retriever for retrieving a cache entry from the cache table by longest prefix match (LPM) retrieval using the destination address of the received packet as a retrieval key, wherein if a retrieved cache entry is found, then the forwarding direction information of the retrieved cache entry is used to determine the forwarding direction of the received packet;
a forwarding table retriever for retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet; and
an LPM cache registration controller controlling such that
when a hit is found in the forwarding table, hit-entry information and included entry information are registered into different unused cache entries, respectively, wherein the hit entry information is information registered in an entry hit by the forwarding table retriever and the included-entry information is information registered in an entry whose prefix information indicates a set of network addresses which is included in a set of network addresses indicated by prefix information of the hit entry, and
when an unused entry is created in the LPM cache table, a predetermined algorithm is used to make a first in-use entry unused and further a second in-use entry is made unused, wherein the second in-use entry is an entry whose prefix information indicates a set of network addresses which includes a set of network addresses indicated by prefix information of the first in-use entry which has been made unused.

15. The router according to claim 14, wherein the predetermined algorithm is LRU (Least Recently Used) algorithm.

16. The router according to claim 14, wherein the forwarding table retriever performs longest prefix match (LPM) retrieval.

17. The router according to claim 14, wherein a cache address area storing cache addresses of the cache table is divided into a resident area and an update area, wherein the LPM cache registration controller determines a cache address at which the cache entry is registered into the cache table, from cache addresses stored in the update area.

18. A router for determining a forwarding direction of a received packet by referring to a cache table and a forwarding table depending an a destination address of the received packet, comprising:
a forwarding table retriever for retrievably storing a plurality of entries;
a cache table retriever for retrievably storing a plurality of cache entries, the cache table retriever capable of longest prefix match (LPM) retrieval;
a cache address determiner for determining a cache address at which a cache entry is registered; and
a cache prefix length determiner for determining a cache prefix length used when registering the destination address of the received packet into the cache table, wherein a cache entry which hits plural destination addresses with only a single cache entry can be registered in the cache so that cache hit probability is increased while decreasing capacity of the cache and wherein a cache address area storing cache addresses of the cache table is divided into a resident area and an update area, wherein the cache address determiner determines a cache address at which a cache entry is registered into the cache table, from cache addresses stored in the update area.

19. The router according to claim 18, wherein the cache prefix length determiner determines a maximum cache prefix length based an cache entries.

20. The router according to claim 18, wherein the cache prefix length determiner determines an optimum cache prefix length based on cache entries.

21. A router for determining a forwarding direction of a received packet depending on a destination address of the received packet, comprising:

a forwarding table for retrievably storing a plurality of entries each including a pair of prefix information and forwarding direction information;

a cache table for retrievably storing a plurality of cache entries each including a pair of cache prefix information and forwarding direction information;

a cache prefix length determiner for determining a cache prefix length of cache prefix information of a cache entry to be registered into the cache table for each entry of the forwarding table based on the plurality of entries stored in the forwarding table;

an LPM cache table retriever for retrieving a cache entry from the cache table using the destination address of the received packet as a retrieval key, wherein a retrieved cache entry has cache prefix information matching the destination address of the received packet restricted by the cache prefix length, and wherein if a retrieved cache entry is found, then the forwarding direction information of the retrieved cache entry to used to determine the forwarding direction of the received packet; and a forwarding table retriever for retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet.

22. The router according to claim 21, wherein the cache prefix length determiner determines a maximum cache prefix length of cache prefix information of a cache entry to be registered into the cache table.

23. The router according to claim 21, wherein cache prefix length determiner determines an optimum cache prefix length of cache prefix information of a cache entry to be registered into the cache table.

24. A method for determining a forwarding direction of a received packet in a router by referring to a cache table and a forwarding table depending an a destination address of the received packet, comprising the steps of:

retrievably storing a plurality of entries in the forwarding table;

retrievably storing a plurality of cache entries in the cache table such that the cache table is searched using a different mask for each cache entry;

determining a cache address at which a cache entry is registered;

determining a cache prefix length as a length of upper bits of the destination address of the received packet which are not masked by a corresponding mask;

registering a cache entry which hits plural destination addresses with only a single cache entry in the cache so that cache hit probability is increased while decreasing capacity of the cache; and dividing a cache address area storing cache addresses of the cache table into a resident area and an update area, wherein a cache address at which a cache entry is registered into the cache table is determined from cache addresses stored in the update area.

25. A method for determining a forwarding direction of a received packet in a router by referring to a cache table and a forwarding table depending on a destination address of the received packet, wherein the forwarding table is capable of retrievably storing a plurality of entries each including a pair of prefix information and forwarding direction information and the cache table is capable of retrievably storing a plurality of cache entries each including a pair of cache prefix information and forwarding direction information, comprising the steps of:

determining a cache prefix length of cache prefix information of a cache entry to be registered into the cache table based on the plurality of entries stored in the forwarding table; and registering the cache entry into the cache table when no hit is found in the cache table but in the forwarding table, wherein the cache prefix information of the cache entry is produced by combining the cache prefix length and the destination address of the received packet.

26. A method for determining a forwarding direction of a received packet in a router by referring to a cache table and a forwarding table depending on a destination address of the received packet, comprising the steps of:

retrievably storing a plurality of entries in the forwarding table;

retrievably storing a plurality of cache entries in the cache table such that the cache table is searched by longest prefix match (LPM) retrieval;

determining a cache address at which a cache entry is registered;

managing the forwarding table in form of tree topology to determine which entry is to be registered into the cache table and to be deleted from the cache table based on a result of retrieval on the forwarding table;

registering a cache entry which hits plural destination addresses with only a single cache entry in the cache so that cache hit probability is increased while decreasing capacity of the cache; and dividing a cache address area storing cache addresses of the cache table into a resident area and an update area, wherein a cache address at which a cache entry is registered into the cache table is determined from cache addresses stored in the update area.

27. A method for determining a forwarding direction of a received packet in a router by referring to a cache table and a forwarding table depending on a destination address of the received packet, wherein the forwarding table is capable of retrievably storing a plurality of entries each including a pair of prefix information and forwarding direction information and the cache table is capable of retrievably storing a plurality of cache entries each including a pair of cache prefix information and forwarding direction information, comprising the steps of:

retrieving a cache entry from the cache table by longest prefix match (LPM) retrieval using the destination address of the received packet as a retrieval key, wherein if a retrieved cache entry is found, then the forwarding direction information of the retrieved cache entry is used to determine the forwarding direction of the received packet;

retrieving an entry from the forwarding table using the destination address of the received packet as a retrieval key when no hit is found in the cache table, wherein if a retrieved entry is found, then the forwarding direction information of the retrieved entry to used to determine the forwarding direction of the received packet;

when a hit is found in the forwarding table, registering hit-entry information and included-entry information into different unused cache entries, respectively, wherein the hit entry information is information registered in an entry hit by the forwarding table retriever and the included-entry information is information registered in an entry whose prefix information indicates a set of network addresses which is included in a set of network addresses indicated by prefix information of the hit entry; and when an unused entry is created in the LPM cache table, making a first in-use entry unused using a predetermined algorithm; and making a second in-use entry unused, wherein the second in-use entry is an entry whose prefix information indicates a set of network addresses which includes a set of network addresses en indicated by prefix information of the first in-use entry which has been made unused.

28. A method for determining a forwarding direction of a received packet in a router by referring to a cache table and a forwarding table depending on a destination address of the received packet, comprising the steps of:

retrievably storing a plurality of entries in the forwarding table;

retrievably storing a plurality of cache entries in the a cache table such that the cache table is searched using longest prefix match (LPM) retrieval;

determining a cache address at which a cache entry is registered; and determining a cache prefix length used when registering the destination address of the received packet into the cache table;

registering a cache entry which hits plural destination addresses with only a single cache entry in the cache so that cache hit probability is increased while decreasing capacity of the cache; and dividing a cache address area storing cache addresses of the cache table into a resident area and an update area, wherein a cache address at which a cache entry is registered into the cache table is determined from cache addresses stored in the update area.

29. A method for determining a forwarding direction of a received packet in a router by referring to a cache table and a forwarding table depending on a destination address of the received packet, wherein the forwarding table is capable of retrievably storing a plurality of entries each including a pair of prefix information and forwarding direction information and the cache table is capable of retrievably storing a plurality of cache entries each including a pair of cache prefix information and forwarding direction information, comprising the steps of:

determining a cache prefix length of cache prefix information of a cache entry to be registered into the cache table for each entry of the forwarding table based on the plurality of entries stored in the forwarding table;

retrieving a cache entry from the cache table using the destination address of the received packet as a retrieval key, wherein a retrieved cache entry has cache prefix information matching the destination address of the received packet restricted by the cache prefix length, and wherein if a retrieved cache entry is found, then the forwarding direction information of the retrieved cache entry is used to determine the forwarding direction of the received packet; and retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet.

30. A storage medium storing a computer program which causes a computer of a router to determine a forwarding direction of a received packet by referring to a cache table and a forwarding table depending on a destination address of the received packet, the computer program comprising the steps of:

retrievably storing a plurality of entries in the forwarding table;

retrievably storing a plurality of cache entries in the cache table such that the cache table searched using a different mask for each cache entry;

determining a cache address at which a cache entry is registered;

determining a cache prefix length as a length of upper bits of the destination address of the received packet which are not masked by a corresponding mask;

registering a cache entry which hits plural destination addresses with only a single cache entry in the cache so that cache hit probability is increased while decreasing capacity of the cache; and wherein a cache address area storing cache addresses of the cache table is divided into a resident area and an update area, wherein a cache address at which a cache entry is registered into the cache table is determined from cache addresses stored in the update area.

31. A storage medium storing a computer program which causes a computer of a router to determine a forwarding direction of a received packet depending on a destination address of the received packet, comprising the steps of:

retrievably storing a plurality of cache entries each including a pair of cache prefix information and forwarding direction information in a cache table;

retrievably storing a plurality of entries each including a pair of prefix information and forwarding direction information in a forwarding table;

retrieving a cache entry from the cache table by longest prefix match (LPM) retrieval using the destination address of the received packet as a retrieval key, wherein if a retrieved cache entry is found, then the forwarding direction information of the retrieved cache entry is used to determine the forwarding direction of the received packet;

retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet;

when a hit is found in the forwarding table, registering hit-entry information and included-entry information into different unused cache entries, respectively, wherein the hit entry information is information registered in an entry hit by the forwarding table retriever and the included-entry information is information is registered in an entry whose prefix information indicates a set of network addresses which is included in a set of network addresses indicated by prefix information of the hit entry; and when an unused entry is created in the LPM cache table, making a first in-use entry unused using a predetermined algorithm; and making a second in-use entry unused, wherein the second in-use entry is an entry whose prefix information indicates a set of network addresses which includes a set of network addresses indicated by prefix information of the first in-use entry which has been made unused.

32. A storage medium storing a computer program which causes a computer of a router to determine a forwarding direction of a received packet by referring to a cache table and a forwarding table depending an d destination address of the received packet, the computer program comprising the steps of:

retrievably storing a plurality of entries in the forwarding table;

retrievably storing a plurality of cache entries in a cache table such that the cache table is searched by longest prefix match (LPM) retrieval;

determining a cache address at which a cache entry is registered;

determining a cache prefix length used when registering the destination address of the received packet into the cache table;

registering a cache entry which hits plural destination addresses with only a single cache entry in the cache so that cache hit probability is increased while decreasing capacity of the cache; and dividing a cache address area storing cache addresses of the cache table into a resident area and an update area, wherein a cache address at which a cache entry is registered into the cache table is determined from cache addresses stored in the update area.

33. A storage medium storing a computer program which causes a computer of a router to determine a forwarding direction of a received packet by referring to a cache table and a forwarding table depending on a destination address of the received packet, the computer program comprising the steps of:

retrievably storing a plurality of entries each including a pair of prefix information and forwarding direction information in a forwarding table;

retrievably storing a plurality of cache entries each including a pair of cache prefix information and forwarding direction information in a cache table;

determining a cache prefix length of cache prefix information for a cache entry to be registered into the cache table for each entry of the forwarding table based on the plurality of entries stored in the forwarding table;

retrieving a cache entry from the cache table using the destination address of the received packet as a retrieval key, wherein a retrieved cache entry has cache prefix information matching the destination address of the received packet restricted by the cache prefix length, and wherein if a retrieved cache entry is found, then the forwarding direction information of the retrieved cache entry is used to determine the forwarding direction of the received packet; and retrieving an entry from the forwarding table using the destination address of the received packet as a retrieval key when no hit is found in the cache table, wherein if a retrieved entry is found, then the forwarding direction information of the retrieved entry is used to determine the forwarding direction of the received packet.

* * * * *